US008139259B2

(12) United States Patent
Shinchi et al.

(10) Patent No.: US 8,139,259 B2

(45) Date of Patent: Mar. 20, 2012

(54) IMAGE FORMING APPARATUS INCLUDING TAB SHEET REVERSING FUNCTION, COMPUTER READABLE RECORDING MEDIUM STORED WITH CONTROL PROGRAM FOR CONTROLLING IMAGE FORMING APPARATUS, AND ITS CONTROL METHOD

(75) Inventors: Toshimi Shinchi, Saitama (JP); Tamotsu Sakuraba, Sagamihara (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1316 days.

(21) Appl. No.: 11/802,037

(22) Filed: May 18, 2007

(65) Prior Publication Data

US 2008/0018936 A1 Jan. 24, 2008

(30) Foreign Application Priority Data

Jul. 20, 2006 (JP) ................................ 2006-198580

(51) Int. Cl.

| | |
|---|---|
| *G06F 3/12* | (2006.01) |
| *G06K 1/00* | (2006.01) |
| *B65H 7/00* | (2006.01) |
| *B65H 33/04* | (2006.01) |
| *B41L 1/20* | (2006.01) |

(52) U.S. Cl. ........ 358/1.18; 358/1.13; 358/1.9; 271/8.1; 399/382; 462/62; 270/58.31

(58) Field of Classification Search ................. 358/1.13, 358/1.16, 1.18, 1.9, 1.12; 271/8.1, 9.01, 271/9.05; 399/382; 462/62, 63; 270/52.04, 270/58.31, 58.32

See application file for complete search history.

(56) References Cited

U.S. PATENT DOCUMENTS

2004/0263869 A1* 12/2004 Kimura .......................... 358/1.1
2006/0145414 A1* 7/2006 Yokobori et al. ........ 271/258.01

FOREIGN PATENT DOCUMENTS

| | | |
|---|---|---|
| JP | 08-133587 | 5/1996 |
| JP | 2003-145878 | 5/2003 |
| JP | 2005-071162 | 3/2005 |
| JP | 2005-089112 | 4/2005 |
| JP | 2005-271259 A | 10/2005 |

OTHER PUBLICATIONS

Notification of Reasons for Refusal in JP 2006-198580 dated Aug. 5, 2008, and English Translation thereof.

* cited by examiner

*Primary Examiner* — Thomas Lett

(74) *Attorney, Agent, or Firm* — Buchanan Ingersoll & Rooney PC

(57) ABSTRACT

A printer, as an image forming apparatus, reverses the front and back sides of tab sheets that became no longer necessary and discharges when a reverse discharge is specified.

4 Claims, 25 Drawing Sheets

100

IMAGE FORMING APPARATUS INCLUDING TAB SHEET REVERSING FUNCTION, COMPUTER READABLE RECORDING MEDIUM STORED WITH CONTROL PROGRAM FOR CONTROLLING IMAGE FORMING APPARATUS, AND ITS CONTROL METHOD

CROSS-REFERENCE TO RELATED APPLICATION

This application is based on Japanese Patent Application No. 2006-198580 filed on Jul. 20, 2006, the contents of which are incorporated herein by reference.

BACKGROUND

1. Technical Field

The present invention relates to an image forming apparatus having tab sheet inserting function, a computer readable recording medium stored with a control program for controlling the image forming apparatus, and its control method.

2. Description of the Related Art

There exist printing apparatuses such as copying machines and printers that are capable of creating printed products by inserting between pages a tab sheet having a flat rectangular main body and a tab protruding at a specified position on a side of said main body. See Japanese Unexamined Patent Publication No. 2005-271259.

In such a printing apparatus, multiple sets of tab sheets consisting of, for example, five tab sheets, whose tab positions are sequentially offset from each other, are used as constituents and are placed in a sheet supply tray. If only first three tab sheets are used in a printing job, the remaining two tab sheets, i.e., the fourth and fifth tab sheets, become no longer necessary and must be discharged. This is because it is necessary to supply tab sheets starting with the first tab sheet of a set in the execution of the next print job.

In the meanwhile, those tab sheets that became no longer necessary can be reused after being discharged. However, as shown in the example described above, the tab sheets that are discharged as unnecessary ones are mostly those with their tabs located in lower positions such as the fourth and fifth. Consequently, this causes a problem of shortage of those tab sheets that belong in the first half of a set, e.g., the first and second sheets, making the system inconvenient to use.

SUMMARY

An image forming apparatus which reflects one aspect of the present invention solves at least one of the abovementioned problems.

There is provided an image forming apparatus comprising a tab sheet supply unit, a judgment unit and a control unit. The tab sheet supply unit supplies tab sheets. The judgment unit judges whether or not a reversing discharge instruction is issued for reversing front and back sides of tab sheets that became no longer necessary before discharging them. The control unit reverses the front and back sides of the tab sheets that became no longer necessary and discharges them when the reversing discharge instruction is issued.

It is preferably that the tab sheet supply unit comprises a plurality of sheet supply trays for supplying multiple types of tab sheets and the control unit further classifies the tab sheets that became no longer necessary according to the types of tab sheets and discharges them.

The objects, features, and characteristics of this invention other than those set forth above will become apparent from the description given herein below with reference to preferred embodiments illustrated in the accompanying drawings.

DETAILED DESCRIPTION

The embodiment of this invention will be described below with reference to the accompanying drawings.

Figure 1:
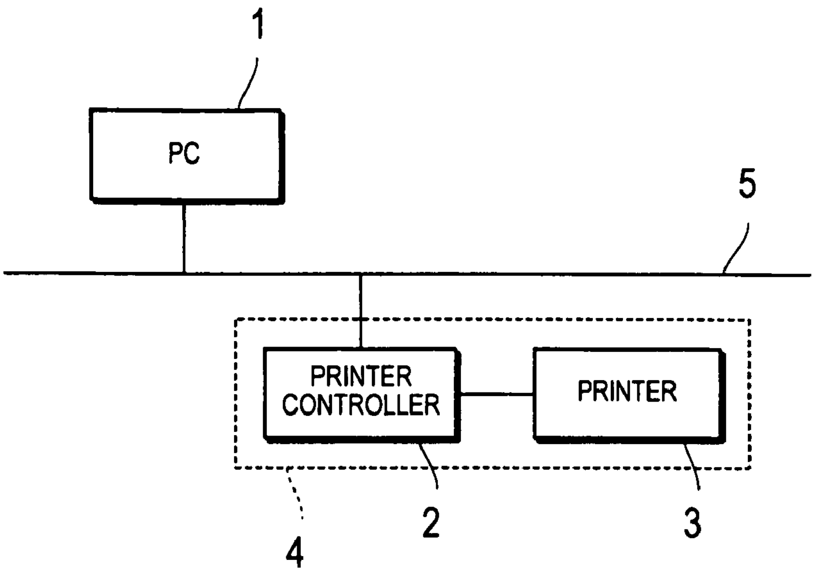
FIG. 1 is a block diagram showing the overall constitution of a network system according to a first embodiment of the present invention.

FIG. 1 is a block diagram showing the overall constitution of a network system according to a first embodiment of the present invention.

The network system that relates to this embodiment is equipped with a PC 1 as a printing instruction device for instructing the printing of the document and a printing system 4 for conducting printing based on printing instructions of the PC 1, which are connected with each other via a network 5. Also, the PC 1 and the printing system 4 can be connected directly (local connection) without recourse to the network 5.

The printing system 4 consists of a printer controller 2 and a printer 3 as an image forming apparatus, which are locally connected with each other. This local connection can be accomplished by means of various local connection interfaces, such as serial interfaces, e.g., USB and IEEE 1394, parallel interfaces, e.g., SCSI and IEEE 1284, wireless communication interfaces, e.g., Bluetooth®, IEEE 802.11, HomeRF®, IrDA®, etc. However, the printer controller 2 and the printer 3 can be connected via the network 5.

Figure 2:
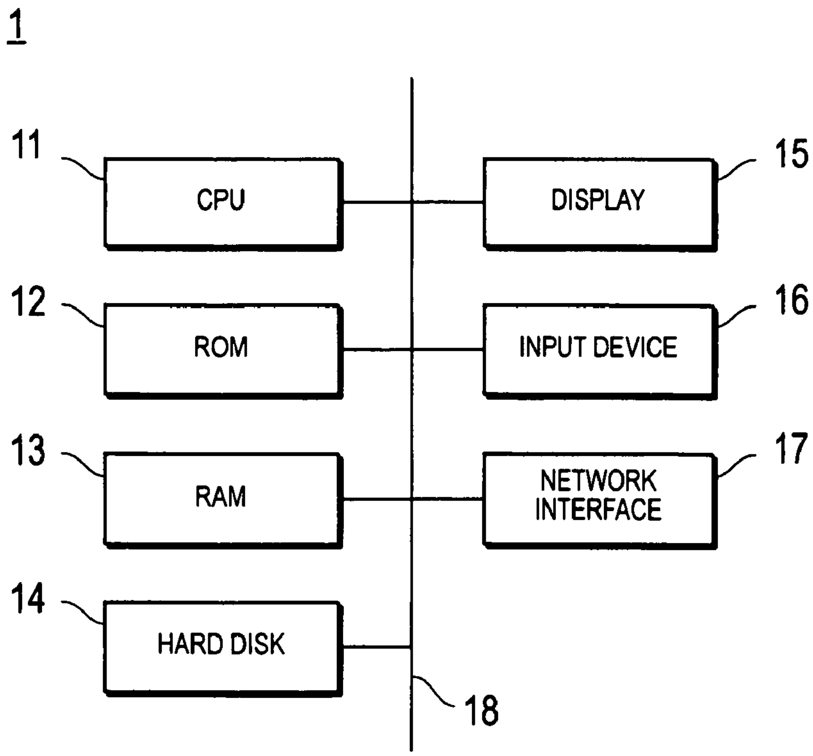
FIG. 2 is a block diagram showing the constitution of the PC shown in FIG. 1.

FIG. 2 is a block diagram showing the constitution of PC 1 shown in FIG. 1.

The PC 1 contains a CPU 11, a ROM 12, a RAM 13, a hard disk 14, a display 15, an input device 16 and a network interface 17, all of which are interconnected via a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

An application program for generating document files and a printer driver for converting the document files into PDL data described in a Page Description Language ("PDL") understood by the printing system 4 are installed on the hard disk 14. The printer driver is capable of providing instructions for printing document files prepared with the use of applications, setting up printing output conditions, and setting up tab sheet related matters. The printer drive contains programs for executing these setups.

The display 15 can be LCD, CRT, and other displays, on which various kinds of information are displayed. The input device 16 includes a pointing device such as a mouse, a keyboard, and others, and is used for executing various kinds of information inputs.

The network interface 17 is an interface for communicating with other devices on the network via the network 5 using standards such as Ethernet®, Token Ring, FDDI, etc.

Figure 3:
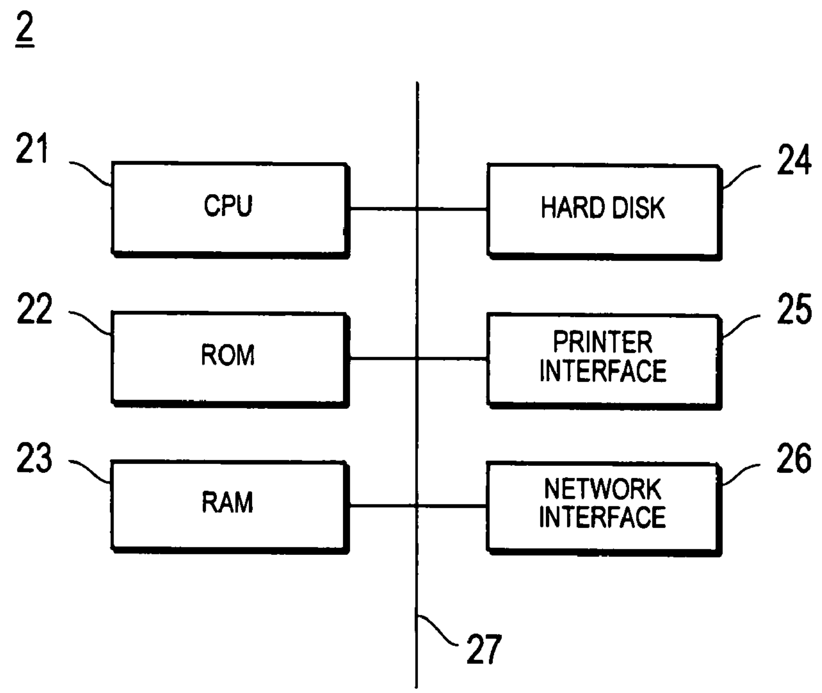
FIG. 3 is a block diagram showing the constitution of the printer controller of the printing system shown in FIG. 1.

FIG. 3 is a block diagram showing the constitution of the printer controller 2 of the printer system 4 shown in FIG. 1.

The printer controller 2 is provided with a CPU 21, a ROM 22, a RAM 23, a hard disk 24, a printer interface 25, and a network interface 26, all of which are interconnected with each other via a bus 27 for exchanging signals. The descriptions of those parts of the printer controller 2 that have the same functions as those of the corresponding parts of the PC 1 will be omitted here to avoid being duplicative.

The ROM 22 and hard disk 24 stores a rasterizing process program for translating PDL data received from PC1 and developing it into bitmap data, which is bitmap type image data, as well as an image data process program for analyzing the received PDL data. The received PDL data and the bitmap data can be saved on the hard disk 24.

The printer interface 25 is an interface for communicating with the locally connected printer 3.

Figure 4:
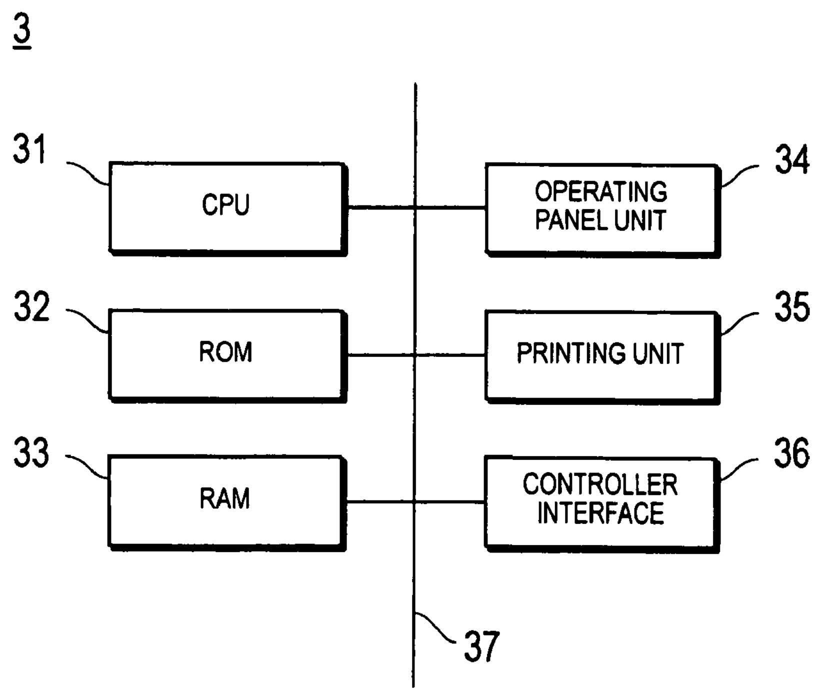
FIG. 4 is a block diagram showing the constitution of the printer of the printing system shown in FIG. 1.

FIG. 4 is a block diagram showing the constitution of the printer 3 of the printing system 4 shown in FIG. 1. The printer 3 has a CPU 31, a ROM 32, a RAM 33, an operating panel 34, a printing unit 35, and a controller interface 36, all of which are interconnected with each other via a bus 37 for exchanging signals. The descriptions of those parts of the printer 3 that have the same functions as those of the corresponding parts of the PC 1 will be omitted here to avoid being duplicative.

The ROM 32 stores a printing process program to be executed based on printing data containing bitmap data received from the printer controller 2.

The operating panel unit 34 is equipped with a touch panel, a ten-key pad, a start button, a stop button and others to be used for displaying various data and entering various instructions.

The printing unit 35 prints images based on bitmap data received from the printer controller 2 using a publicly known imaging process such as the electronic photography process on recording media such as paper. The controller interface 36 is an interface for communicating with the locally connected printer controller 2.

Figure 5:
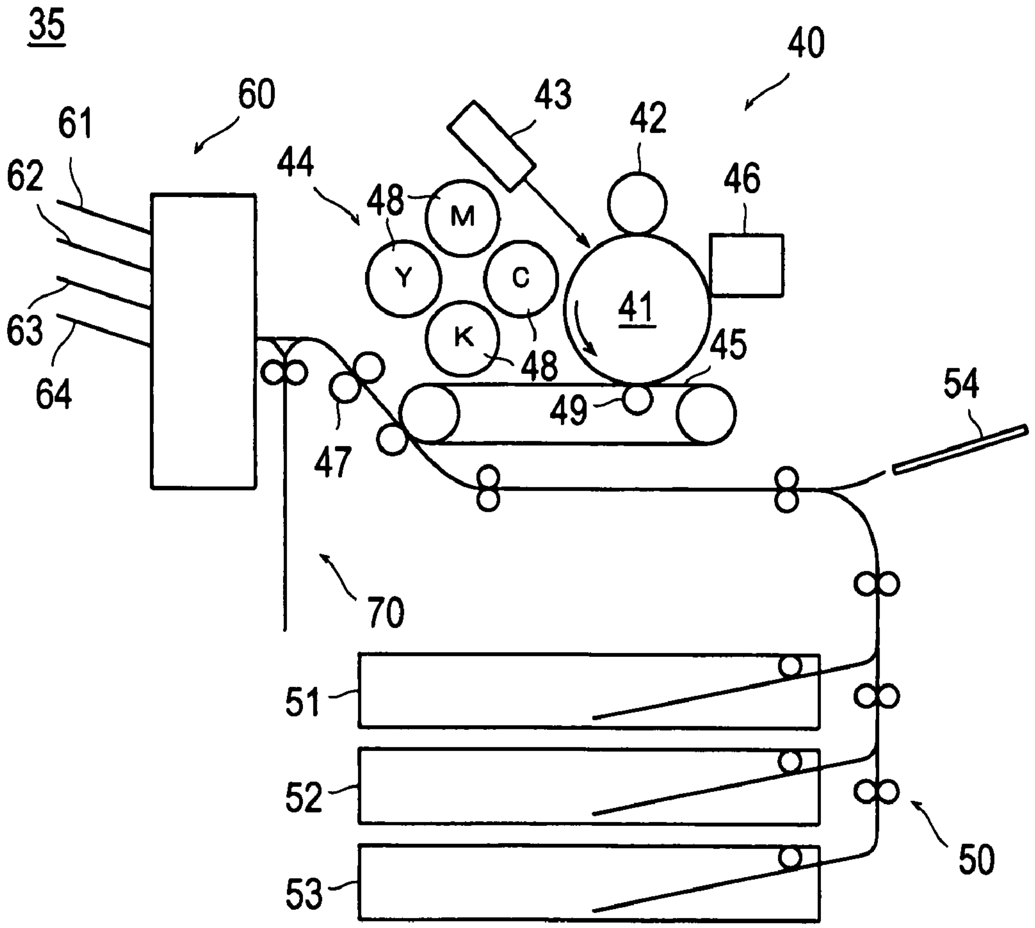
FIG. 5 is a diagram showing the typical constitution of a printing unit.

FIG. 5 is a diagram showing the typical constitution of a printing unit 35.

The printing unit 35 has a paper supply unit 50 for supplying recording media such as printing paper and insertion sheets such as tab sheets, an image forming unit 40 for forming images on the recording media, and a paper discharge unit 60 for discharging printing paper and tab sheets. The printing unit 35 also has a reversing mechanism unit 70 for reversing the front and back sides of printing paper.

The image forming unit 40 of the printing unit 35 has a sensitizer drum 41 that rotates in the arrow direction, a charging device 42, exposing device 43, a developing device 44, an intermediate transfer belt 45, a cleaning device 46, and a fixing device 47. After the surface of the sensitizer drum 41 is evenly charged by means of the charging device 42, an electrostatic latent image is formed on the surface of the sensitizer drum 41 as it is irradiated with laser beams by the exposing device 43. The electrostatic latent image becomes an apparent image as the toner adheres to the electrostatic latent image on the sensitizer drum 41 in accordance with the rotation of the sensitizer drum 41. The developing device 44 has developing rollers 48 of cyan (C), magenta (M), yellow (Y), and black (K) respectively. The toner images of these colors thus becoming apparent images are then transported to the transferring unit 49 where they are transferred onto the intermediate transfer belt 45 one after the other to be overlaid on top of each other. The overlaid color images are then transferred onto the printing paper supplied by the paper supply unit 50. The toner images are then fixed on the printing paper by the fixing device 47 and transported to the paper discharge unit 60.

Figure 28:
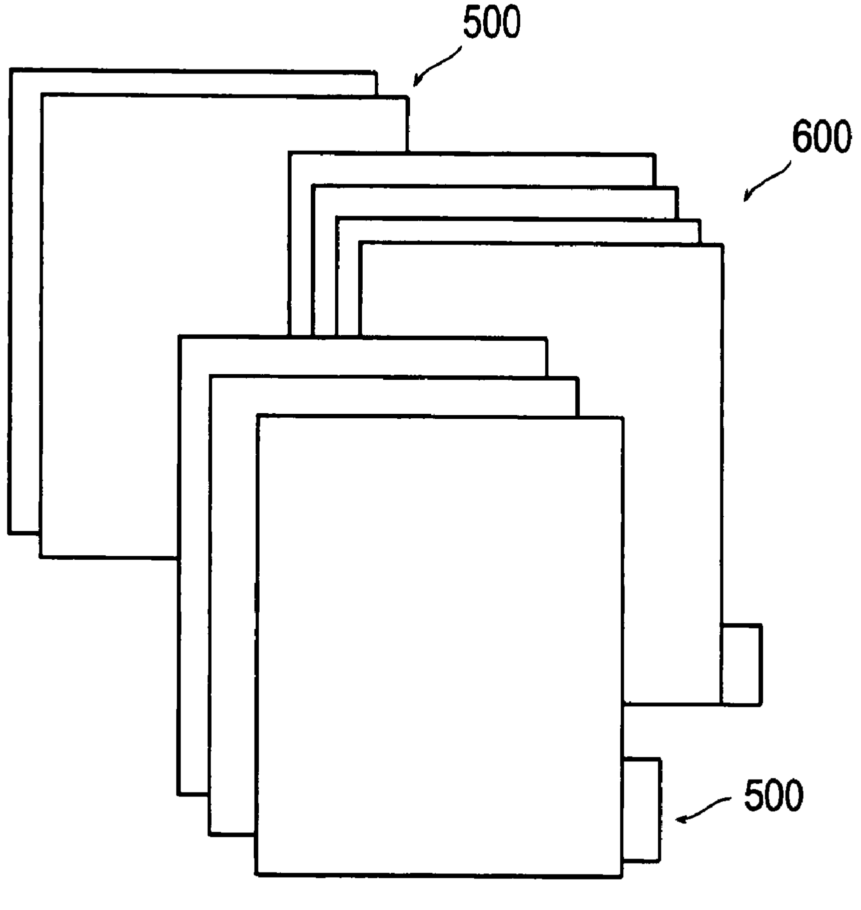
FIG. 28 is a diagram for describing another method of discharging tab sheets that became no longer necessary.

The paper supply unit 50 has a plurality of sheet supply trays 51-54. The sheet supply tray 54 is a manual feed sheet supply tray. The paper discharge unit 60 is equipped with a plurality of paper discharge trays 61-64. The paper discharge unit 60 is equipped with a mechanism for offsetting the discharge position, i.e., for shifting the discharge position into a direction perpendicular to the transport direction (FIG. 28).

The paper discharge unit 60 may have a post-processing unit for providing post-processes such as punching or stapling to the printing paper transported there.

Figure 6A:
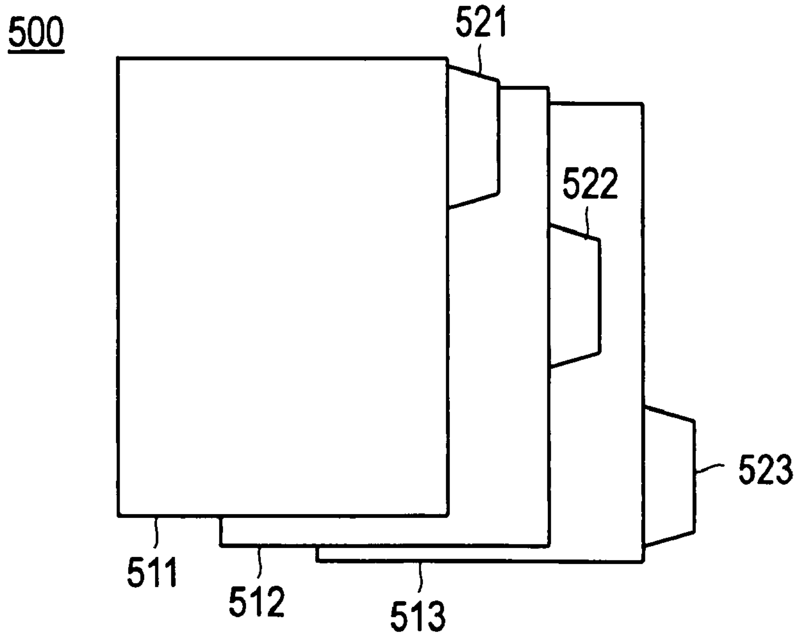
FIG. 6A is a diagram showing three tab sheets used in this embodiment.
Figure 6B:
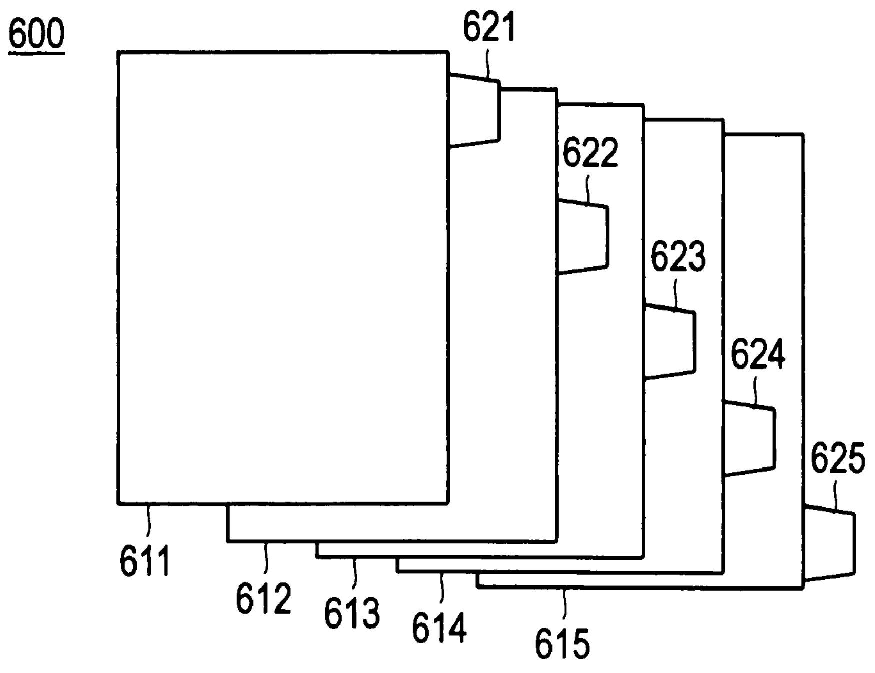
FIG. 6B is a diagram showing five tab sheets used in this embodiment.

FIGS. 6A and 6B show examples of the tab sheet used in this embodiment. FIG. 6A shows a three tab sheet 500 and FIG. 6B shows a five tab sheet 600. Tab sheets are also called index sheets. As shown in FIG. 6A, the tab sheet 500 is a set consisting of three sheets 511-513 and is called a "three-tab." Each of the tab sheets 511-513 has a flat rectangular main body and a tab 521-523 respectively protruding at a specified position on a side of said main body. As shown in FIG. 6B, the tab sheet 600 is a set consisting of five sheets 611-615 and is called a "five-tab." Each of the tab sheets 611-615 has a flat rectangular main body and a tab 621-625 respectively protruding at a specified position on a side of said main body.

The order of the tab sheets shown in FIG. 6 is called the normal order and is arranged in such a way that the tab of an upper layer sheet is found above the tab of a lower layer sheet in FIG. 6 when all of their tabs are on the right side. In case of the three-tab sheet 500, the tabs 521-523 are provided on one side of the main body lowering their positions sequentially in three steps from the top to the bottom. The positions of the tabs 521, 522, and 523 are identified as ⅓ (one-third), ⅔ (two-thirds), and 3/3 (three-thirds) respectively. In case of the five-tab sheet 600, the tabs 621-625 are provided on one side of the main body lowering their positions sequentially in five steps from the top to the bottom. The positions of the tabs 621, 622, 623, 624, and 625 are identified as ⅕ (one-fifth), ⅖ (two-fifths), ⅗ (three-fifths), ⅘ (four-fifths), and 5/5 (five-fifths) respectively. The tab sheets 500 and 600 are normally provided in multiple sets in the sheet supply tray.

The operation of the network system in this embodiment will be described in the following.

Figure 7:
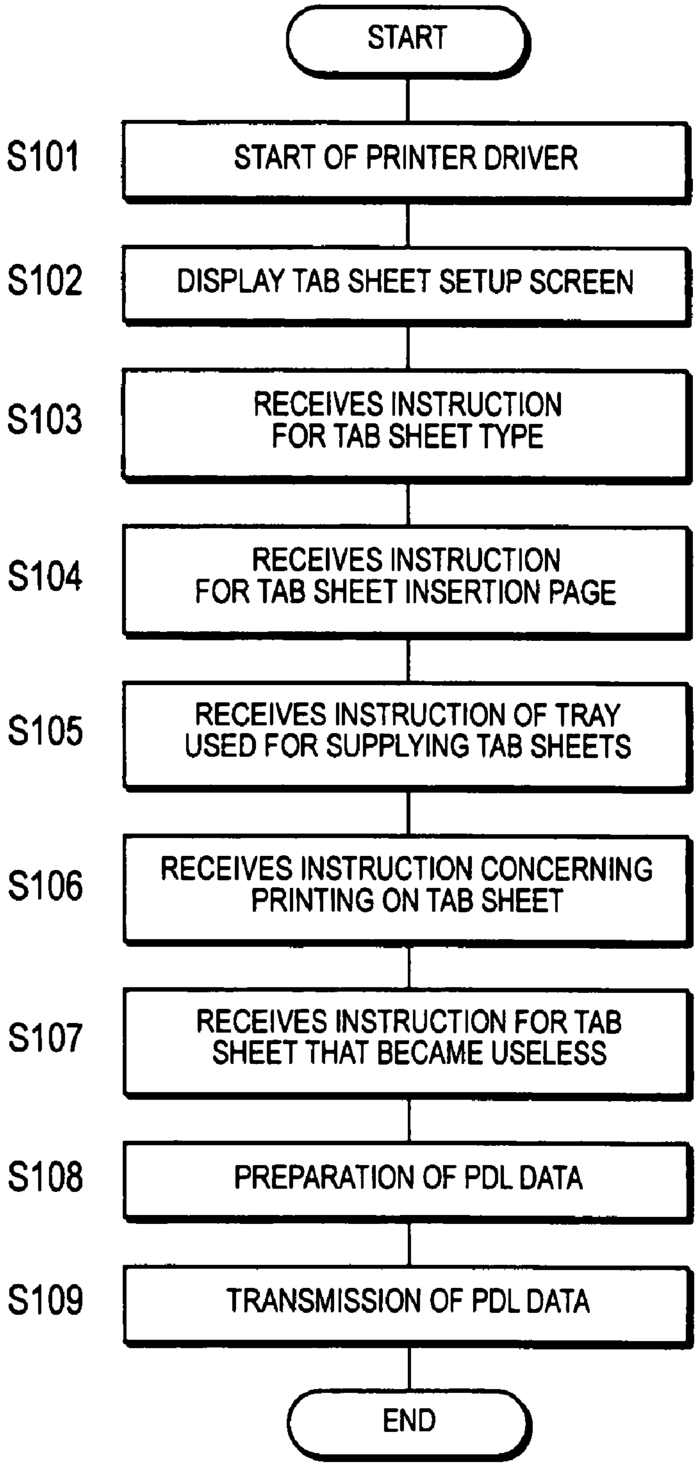
FIG. 7 is a flow chart showing the process procedure on the PC.

FIG. 7 is a flow chart showing the process procedure on the PC 1. The algorithm shown in the flowchart of FIG. 7 is stored as a program in a memory unit such as a hard disk 14 of the PC 1 and executed by the CPU 11.

As a preamble, a document file to be printed is prepared by the PC 1. The document file is prepared by an application installed on the PC 1.

When the printing process for a document file is executed, the printer driver is activated via printing setup dialogs of the application based on the user's operation (S101).

Next, when a tab paper setup button 101 is clicked on the printing setup screen which is displayed by the printer driver, the tab paper setup start request is accepted and the tab sheet setup screen is displayed on the display 15 (S102).

Figure 8:
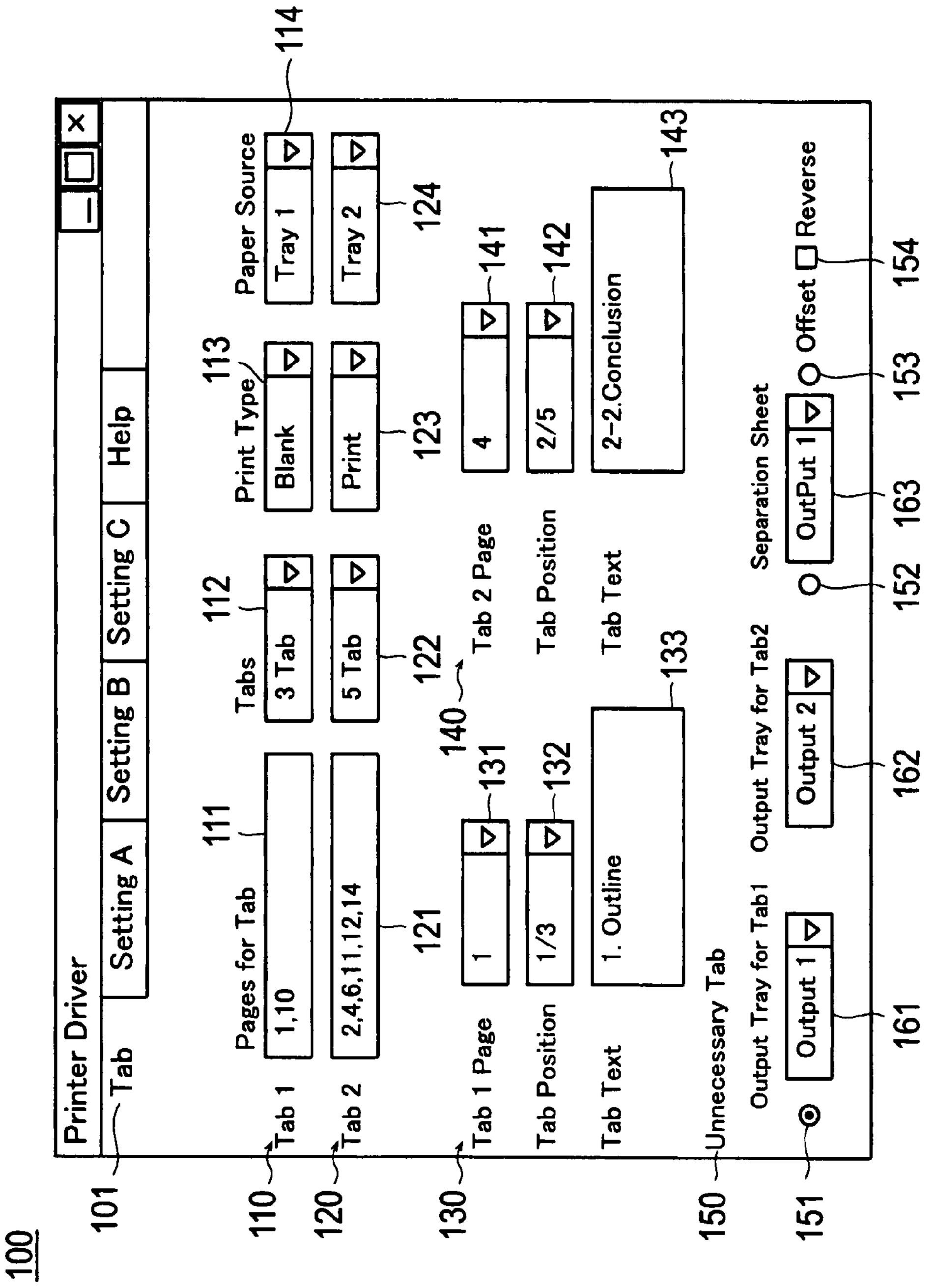
FIG. 8 is an example of tab sheet setup screen in a first embodiment.

FIG. 8 is a diagram showing an example tab sheet setup screen 100.

The tab sheet setup screen 100 has a first tab sheet insertion setup section 110 for setting up the first tab sheet's insertion, and a second tab sheet insertion setup section 120 for setting up the second tab sheet's insertion.

The first tab sheet insertion setup section 110 includes a first insertion page position setup section 111 which the user can use to specify the insertion page position where a tab sheet is inserted, and the second tab sheet insertion setup section 120 includes a second insertion page position setup section 121 which the user can use to specify the insertion page position where a tab sheet is inserted. Here the term "page" signifies a page of a document which is the object of the printing process and is a notion that does not include the tab paper. In the present embodiment, the tab sheet is inserted ahead of the page designated as the insertion page position in the setup process. However, the tab sheet can be inserted behind the page designated as the insertion page position in the setup process.

The first tab sheet insertion setup section 110 includes a first tab sheet type setup section 112 that the user can use for selecting a type of tab sheet, and the second tab sheet insertion setup section 120 includes a second tab sheet type setup section 122 that the user can use for selecting another type of tab sheet. The first tab sheet type setup section 112 and the second tab sheet type setup section 122 each displays a plurality of options for selecting the type of tab sheet. The type of tab sheet is not limited to the three-tab and five-tab sheets shown in FIG. 6 and can include tab sheets consisting of more tabs such as seven tabs and 10 tabs, or tab sheets of different colors.

The first tab sheet insertion setup section 110 includes a first tab printing setup section 113 for setting up whether any printing is to be executed on the tab of the tab sheet, and the second tab sheet insertion setup section 120 includes a second tab printing setup section 123 for setting up whether any printing is to be executed on the tab of the tab sheet. The available options here are "Print" and "Blank," where selecting "Print" causes the tab to be printed and selecting "Blank" causes the tab not to be printed.

The first tab sheet insertion setup section 110 includes a first sheet supply tray setup section 114 that the user can use for selecting a tab sheet supply tray, and the second tab sheet insertion setup section 120 includes a second sheet supply tray setup section 124 that the user can use for selecting another tab sheet supply tray. The first sheet supply tray setup section 114 and the second sheet supply tray setup section 124 each displays a plurality of options for selecting sheet supply trays. Here "Tray 1" designates a sheet supply tray 51 and "Tray 2" designates a sheet supply tray 52 (see FIG. 5).

The tab sheet setup screen 100 further has a first tab sheet setup section 130 for setting up a tab sheet that corresponds to the inserting page position set up in the first insertion page position setup section 111, and a second tab sheet setup section 140 for setting up a tab sheet that corresponds to the inserting page position set up in the second insertion page position setup section 121.

The first tab sheet setup section 130 includes a first object page position setup section 131 that the user can use for designating an object page position in the setup process, and the second sheet setup section 140 includes a second object page position setup section 141 that the user can use for designating an object page position in the setup process. Here the first object page position setup section 131 selectively displays the insertion page position set up in the first page position setup section 111. For example, in case of FIG. 8, the first object page position setup section 131 displays two options of page 1 or 10. The second object page position setup section 141 selectively displays the insertion page position set up in the second page position setup section 121. For example, in case of FIG. 8, the second object page position setup section 141 displays six options of page 2, 4, 6, 11, 12 or 14.

The first tab sheet setup section 130 includes a first tab position setup section 132 for designating the tab position on the tab sheet that corresponds to the insertion page position designated in the first insertion page position setup section 111, and the second tab sheet setup section 140 includes a second tab position setup section 142 for designating the tab position on the tab sheet that corresponds to the insertion page position designated in the second insertion page position setup section 121.

The first tab sheet setup section 130 includes a first tab printing information setup section 133 for designating the tab printing information on the tab sheet that corresponds to the insertion page position designated in the first insertion page position setup section 111, and the second tab sheet setup section 140 includes a second tab printing information setup section 143 for designating the tab printing information on the tab sheet that corresponds to the insertion page position designated in the first insertion page position setup section 121.

The tab sheet setup screen 100 has a tab sheet discharge setup section 150 for setting up a process of classifying and discharging tab sheets which have become no longer necessary based on tab sheet types. For example, if only the tab sheets 621, 622 and 623 out of all the constituents of the five-tab sheet 600 are used in a printing job, the remaining constituents 624 and 625 become no longer necessary as it is necessary to use the tab sheets starting with the tab sheet 621 in a specified occasion such as the execution of the next printing job.

The tab sheet discharge setup section 150 includes a separate discharge setup section 151 for setting up the discharge of tab sheets that became no longer necessary classifying them to discharge them into separate discharge trays; a separation sheet insertion setup section 152 for setting up the insertion of a separation sheet at each tab sheet type change point when discharging tab sheets that became no longer necessary; and an offset setup section 153 for setting up the positions of discharging tab sheets that became no longer necessary by offsetting the positions in accordance with the types of tab sheets. It is so arranged that the user can select one of the setup sections 151-153. The setup sections 151-153 are radio buttons.

The separate discharging setup section 151 includes a first discharge tray setup section 161 that the user can use for selecting a discharge tray as the discharge destination for a first tab sheet that became no longer necessary and a second discharge tray setup section 162 that the user can use for selecting a discharge tray as the discharge destination for a second tab sheet that became no longer necessary. "Output 1" here designates a sheet discharge tray 61 and "Output 2" designates a sheet discharge tray 62 (see FIG. 5). The separation sheet insertion setup section 152 includes a sheet supply tray setup section 163 that the user can use for selecting a sheet supply tray for the separation sheet. "Tray 3" designates a sheet supply tray 53 (see FIG. 5).

The tab sheet discharge setup section 150 includes a reversing setup section 154 for giving an instruction to reverse the front and back sides of the tab sheets that became no longer necessary before they are discharged. The reversing setup section 154 is a checkbox. When this checkbox is checkmarked, the front-and-back reversing function is set up.

Going back to the flowchart of FIG. 7, the type of tab sheet is specified in step S103. The user specifies the type of the first tab sheet at the first tab sheet type setup section 112 and specifies the type of the second tab sheet at the second tab sheet type setup section 122.

Figure 9:
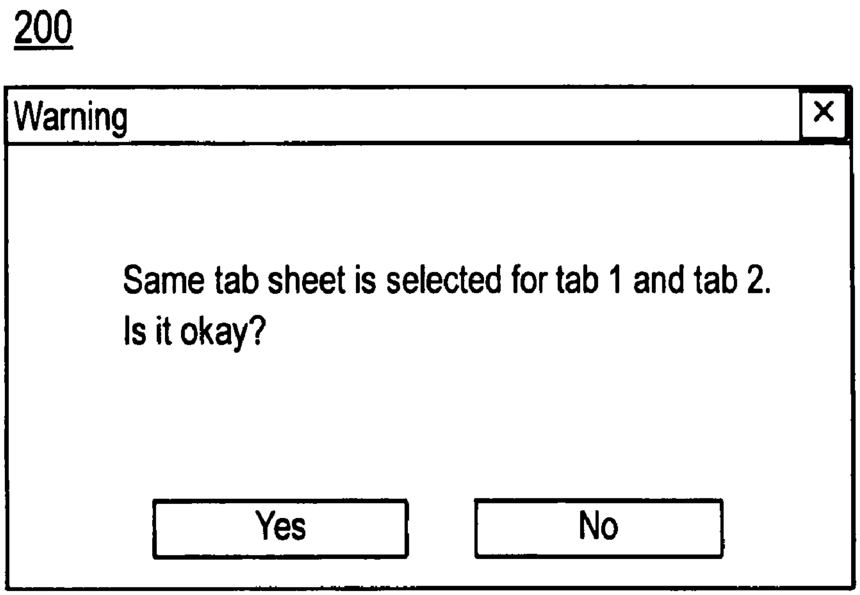
FIG. 9 is a diagram showing an example of a warning screen.

If the type of the tab sheet selected at the first tab sheet type setup section 112 and the type of the tab sheet selected at the second tab sheet type setup section 122 are identical, a warning is issued to the user. This is because it is expected that different types of tab sheets are used normally when both the first tab sheet type setup section 112 and the second tab sheet type setup section 122 are used. FIG. 9 shows an example of a warning screen 200.

Figure 10:
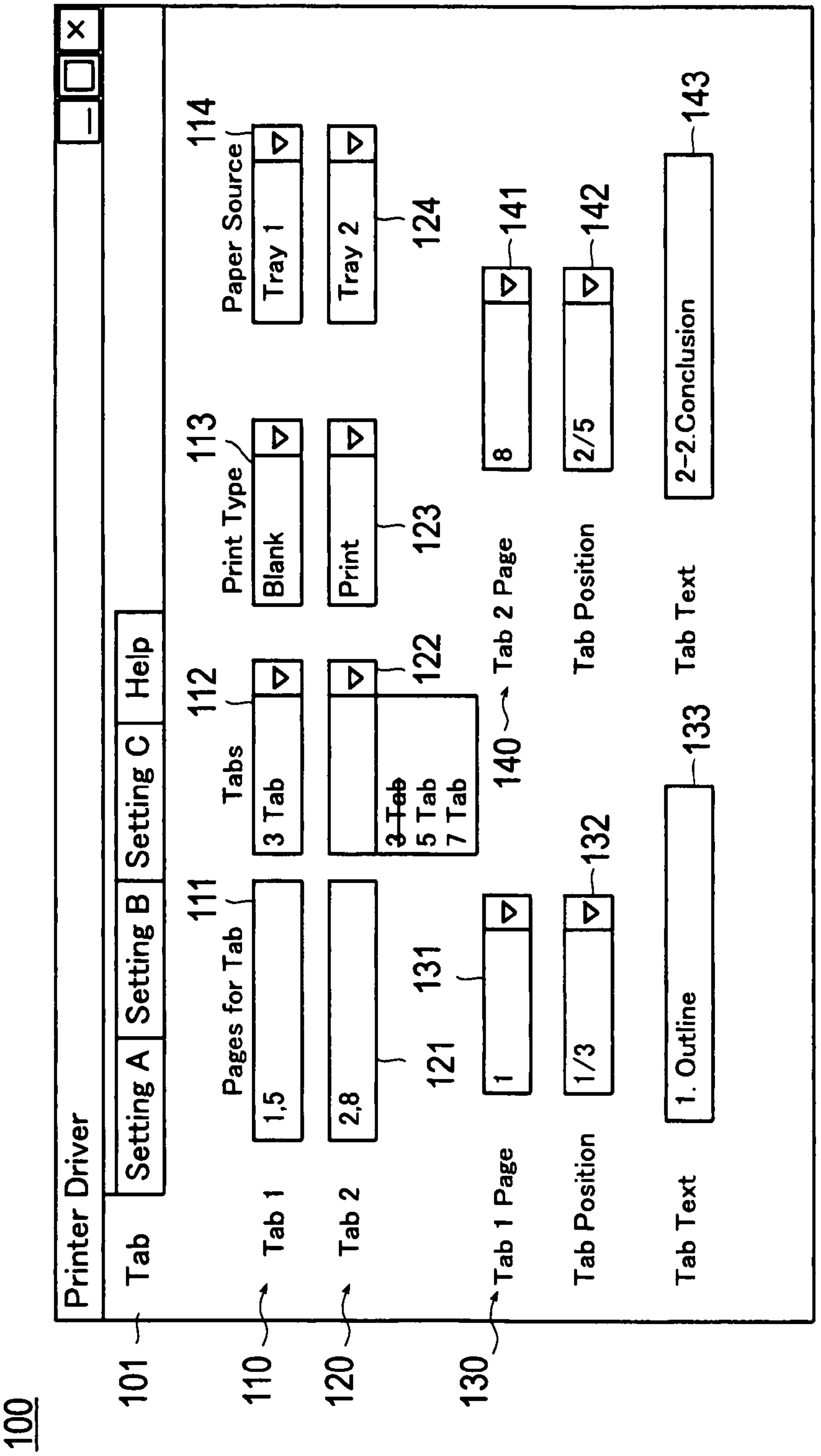
FIG. 10 is a diagram showing the tab sheet setup screen being used.
Figure 11:
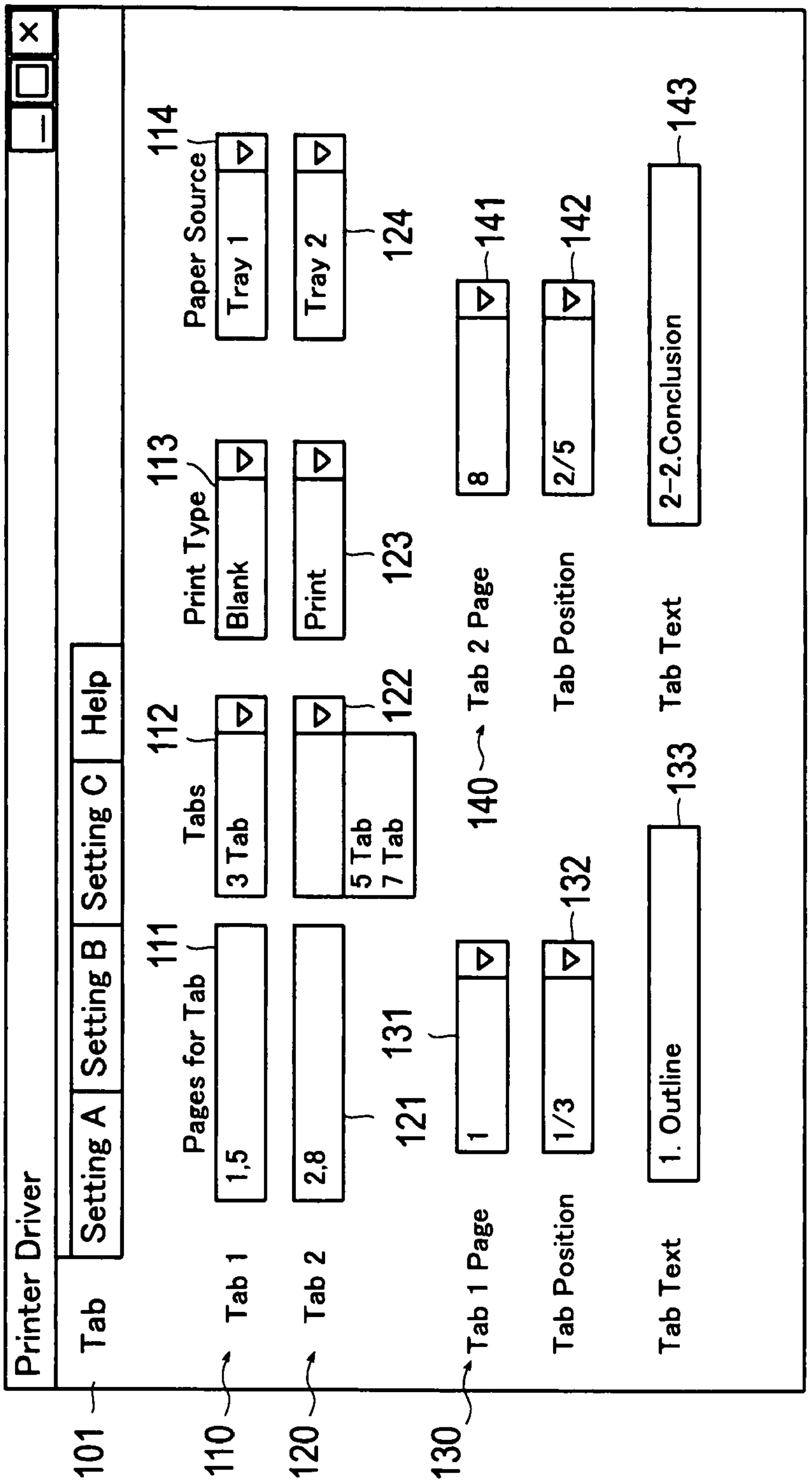
FIG. 11 is a diagram showing the tab sheet setup screen being used.

However, it is also possible to constitute in such a way as to prohibit the type of the tab sheet selected at the second tab sheet type setup section 122 from being set up identical to the type of the tab sheet selected at the first tab sheet type setup section 112 (see FIG. 10). In this case, as shown in FIG. 11, it can be controlled in such a way that the choice of tab sheet type available at the second tab sheet type setup section 122 shall not include the choice made at the first tab sheet type setup section 112. In FIGS. 10 and 11, the description of the tab sheet discharge setup section 150 is omitted (same applies to the diagrams of the tab sheet setup screen hereafter).

Figure 12:
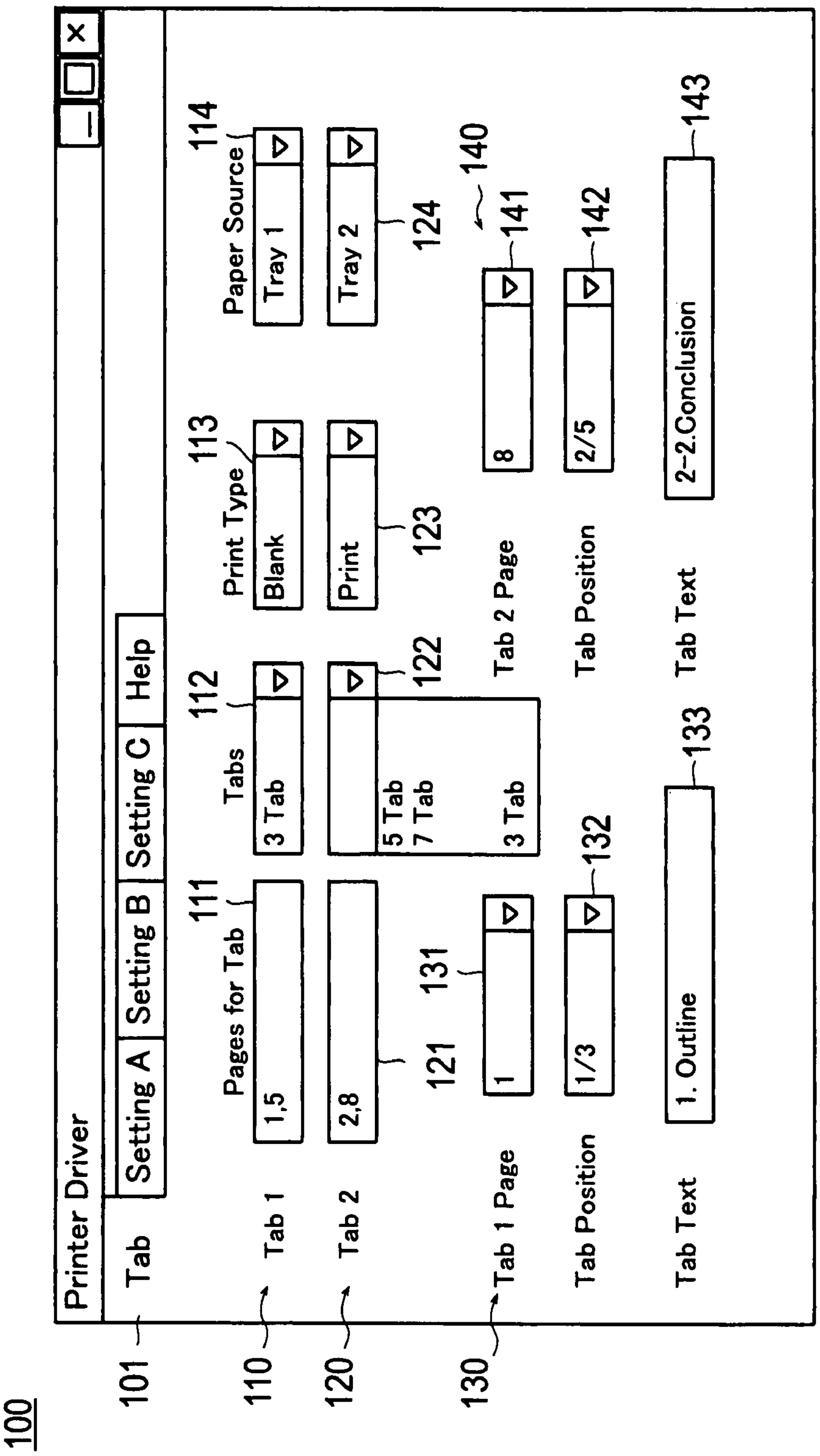
FIG. 12 is a diagram showing the tab sheet setup screen being used.

As an alternative, it can be arranged, as shown in FIG. 12, in such a way that the choice of tab sheet selection made at the first tab sheet type setup section 112 is placed lower in the preferential order displayed at the second tab sheet type setup section 122. Thus, the user is prompted not to specify the same type of tab sheet as the first and second tab sheets simultaneously.

In step S104, the instruction for tab sheet insertion page is received. In other words, the user enters at the first insertion page position setup section 111 the page at which the user wants the first tab sheet to be inserted and enters at the second insertion page position setup section 121 the page at which the user wants the second tab sheet to be inserted.

Figure 13:
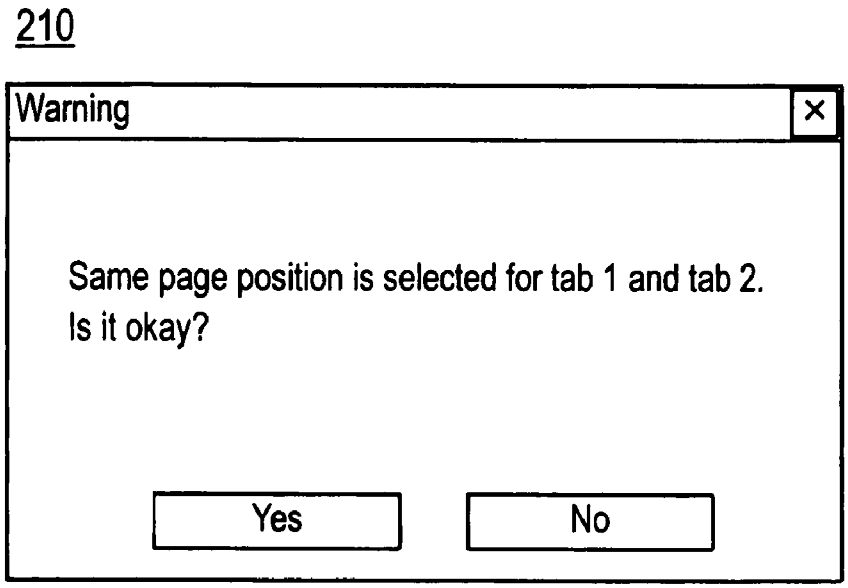
FIG. 13 is a diagram showing an example of a warning screen.

If the insertion page position specified at the first insertion page position setup section 111 is identical to the insertion page position specified at the second insertion page position setup section 121, a warning is issued to the user. This is because different pages are often specified for the first insertion page position setup section 111 and the second insertion page position setup section 121 when both of them are used. FIG. 13 shows an example of such a warning screen 210.

Figure 14:
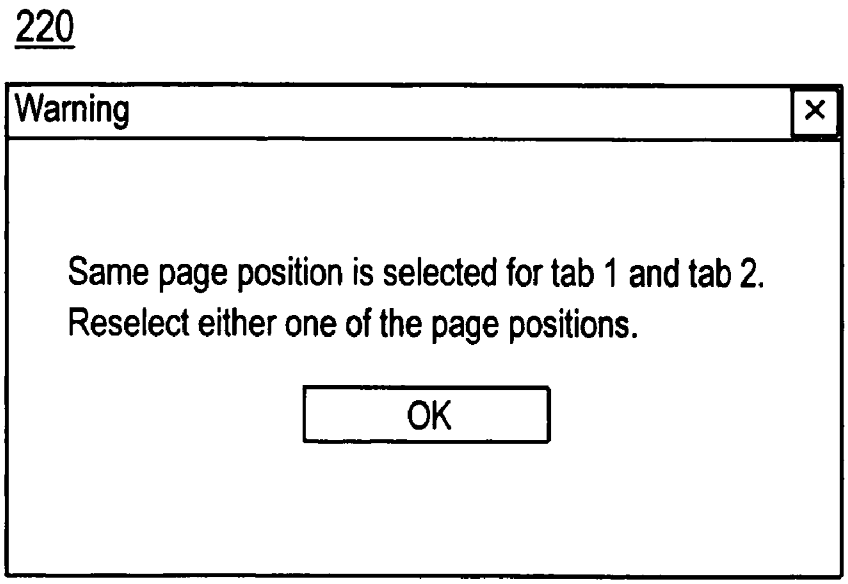
FIG. 14 is a diagram showing an example of a warning screen.

However, it is also possible to constitute in such a way as to prevent the insertion page selected at the second tab sheet type setup section 121 from being set up identical to the insertion page selected at the first tab sheet type setup section 111. In this case, as shown in a warning screen 220 of FIG. 14, a message prompting the user to correct one of the instructions that are designating the same insertion page position appears on the warning screen 220.

It can also be constituted in such a way as to limit the range of insertion page position that can be set up at the second insertion page position setup section 121 based on the insertion page location set up at the first insertion page position setup section 111. For example, the range of insertion page position that can be set up at the second insertion page position setup section 121 can be designated as any insertion page except the insertion page setup at the first insertion page position setup section 111. Alternatively, the range of insertion page position that can be specified at the second insertion page position setup section 121 can be designated as any insertion page behind the last insertion page setup at the first insertion page position setup section 111.

In step S105, the instruction for the sheet supply tray for supplying tab sheets is received. The user specifies a first sheet supply tray for the first tab sheet at the first sheet supply tray setup section 114 and specifies a second sheet tray for the second tab sheet at the second sheet tray setup section 124.

Figure 15:
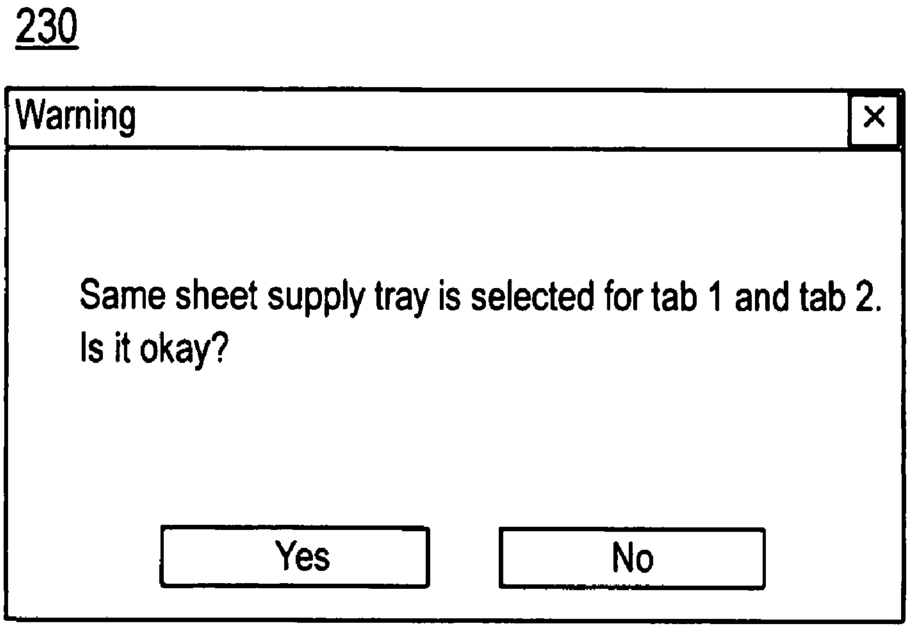
FIG. 15 is a diagram showing an example of a warning screen.

If the sheet tray selected at the first sheet supply tray setup section 114 is identical to the sheet tray selected at the second sheet supply tray setup section 124, a warning is issued to the user. This is because different sheet trays are often specified at both the first sheet supply tray setup section 114 and the second sheet supply tray setup section 124 when both of them are used. FIG. 15 shows an example of a warning screen 230.

Figure 16:
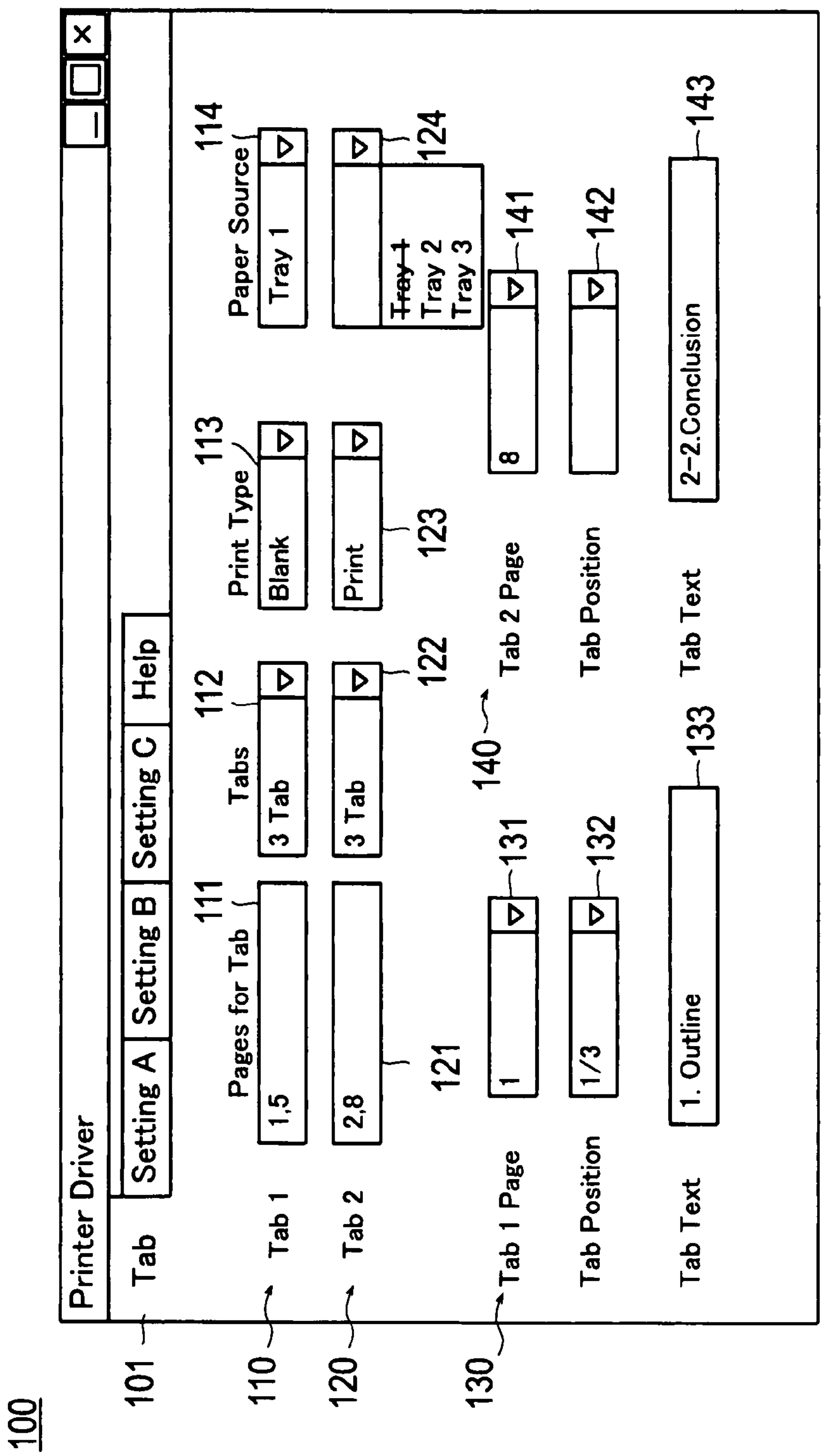
FIG. 16 is a diagram showing the tab sheet setup screen being used.

However, it is also possible to constitute in such a way as to prohibit the sheet supply tray selected at the second sheet supply tray setup section 124 from being set up identical to the sheet supply tray selected at the first sheet supply tray setup section 114 (see FIG. 16). In this case, as shown in FIG. 17, it can be controlled in such a way that the choice of sheet supply tray available at the second sheet supply tray setup section 124 shall not include the choice made at the first sheet supply tray setup section 114.

Figure 18:
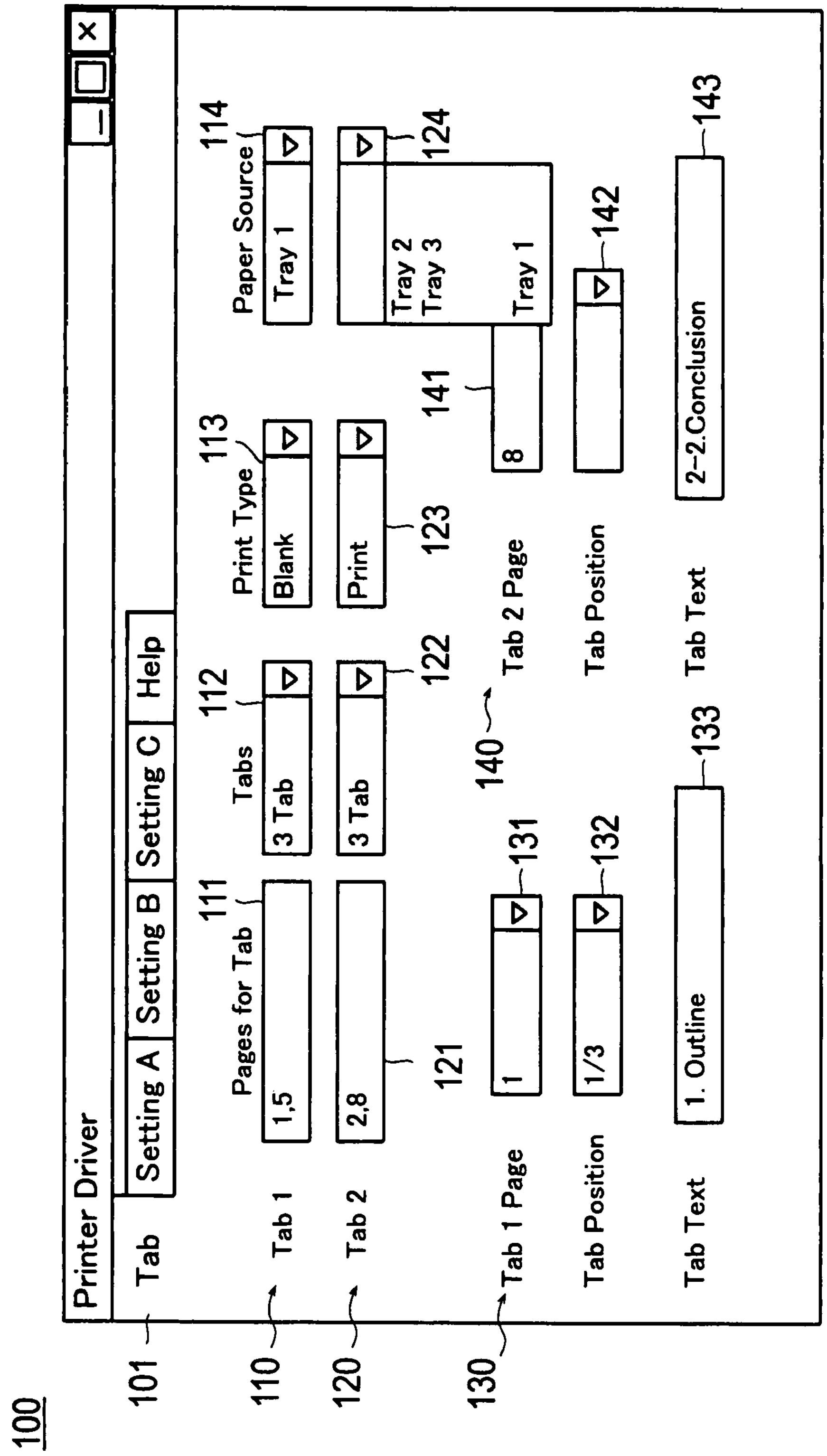
FIG. 18 is a diagram showing the tab sheet setup screen being used.

As an alternative, it can be arranged in such a way that the choice of sheet supply tray selection made at the first sheet supply tray setup section 114 be placed lower in the preferential order displayed at the second sheet supply tray setup section 124 as shown in FIG. 18. Thus, the user is prompted not to specify the same tab sheet tray as the first and second tab sheet supply trays simultaneously.

Figure 17:
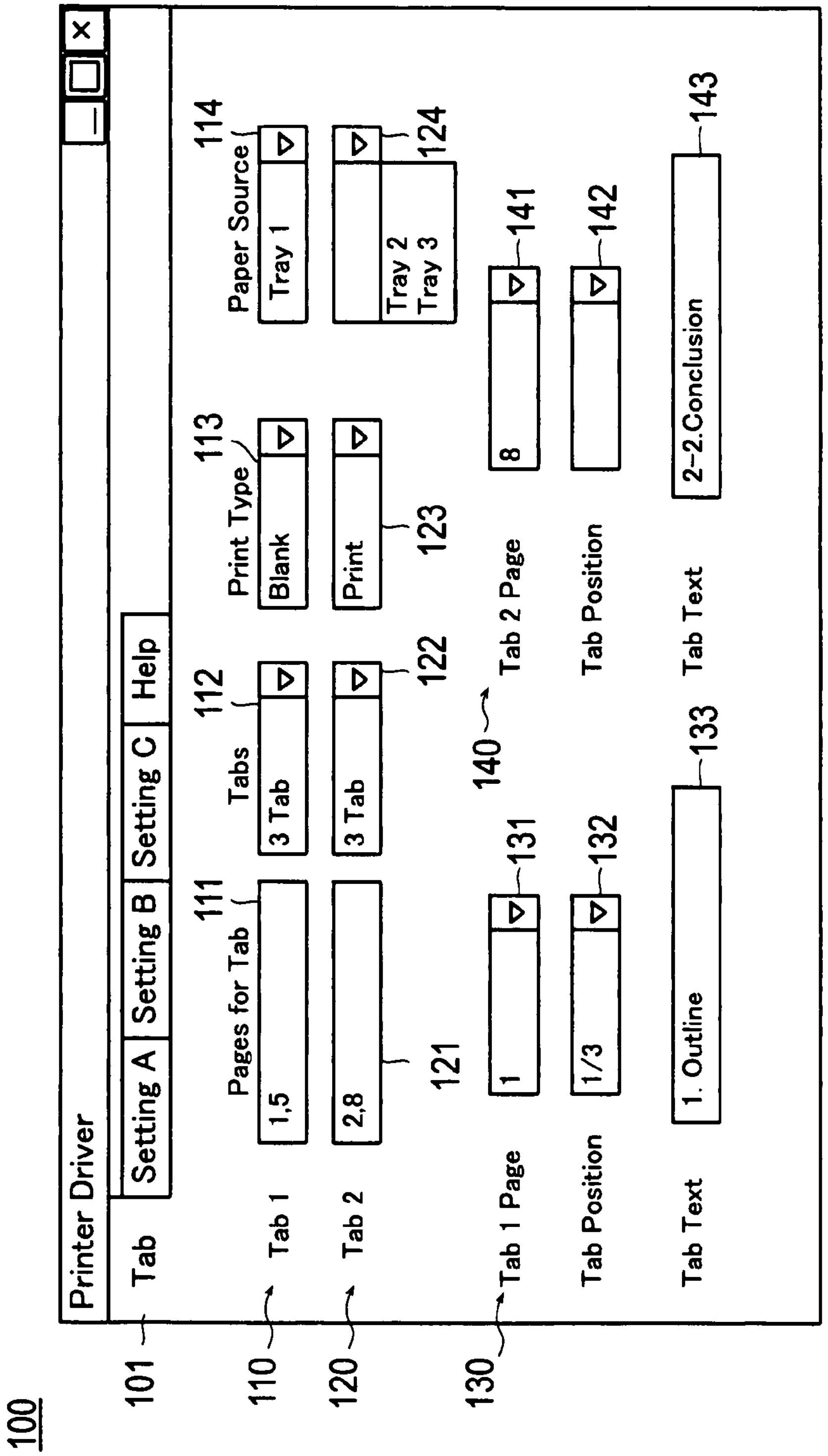
FIG. 17 is a diagram showing the tab sheet setup screen being used.

It can also be constituted in such a way as to prohibit the type of the sheet supply tray selected at the second sheet supply tray setup section 124 from being set up identical to the sheet supply tray selected at the first sheet supply tray setup section 114, if the type of tab sheet set up in the first tab sheet type setup section 112 is identical to the type of tab sheet set up in the second tab sheet type setup section 122 (see FIGS. 16 and 17). In this case, the user can minimize the quantity of tab sheets that became no longer necessary to be discharged as it is possible to store same type of tab sheets in the two sheet supply trays and use both sheet supply trays arbitrarily.

In step S106, the instruction for tab sheet printing is received.

First, the user specifies whether to print the tab of the first tab sheet or not at the first tab printing setup section 113, and whether to print the tab of the second tab sheet or not at the second tab printing setup section 123

Next, the user specifies at the first object page position setup section 131 the object page position for setting up the tab sheet corresponding to the insertion page position set up in the first insertion page position setup section 111. The user also specifies the tab position of the tab sheet at the first tab position setup section 132. The user further specifies the information to be printed on the tab of the tab sheet at the first tab printing information setup section 133. The user can, specify similar items at the second tab sheet setup section 140 as those items specified at the first tab sheet setup section 130.

The first object page position setup section 131 displays the insertion page position set up at the first insertion page position setup section 111 to be selectable, and the second object page position setup section 141 displays the insertion page position set up at the second insertion page position setup section 121 to be selectable. This improves the user's productivity and prevents errors in the setup.

In case the insertion page position specified at the first insertion page position setup section 111 is identical to the insertion page position specified at the second insertion page position setup section 121 and the tab position on the tab sheet is different for those tab sheets, the tab sheet whose tab position is higher is set up ahead of the other. Also, in case the insertion page position specified at the first insertion page position setup section 111 is identical to the insertion page position specified at the second insertion page position setup section 121 and the tab positions on both tab sheets are identical, the tab positions of those tab sheets are forcibly set to be different from each other. Also, in case the insertion page position specified at the first insertion page position setup section 111 is identical to the insertion page position specified at the second insertion page position setup section 121 and the tab size on both tab sheets are identical, the tab sizes of those tab sheets are forcibly set to be different from each other. For example, if both tab sheets are of three-tab, one of them is forced to be changed to five-tab. In this case, the tab sheet with a larger tab of the two tab sheets is placed ahead of the other. This makes both tabs to be more identifiable by the user.

Moreover, if the insertion page position specified at the first insertion page position setup section 111 is identical to the insertion page position specified at the second insertion page position setup section 121 and the first tab sheet is used for the chapter break while the second tab sheet is used for the paragraph break, the first tab sheet is set up ahead of the second tab sheet. This makes it match the user's intension.

Figure 19:
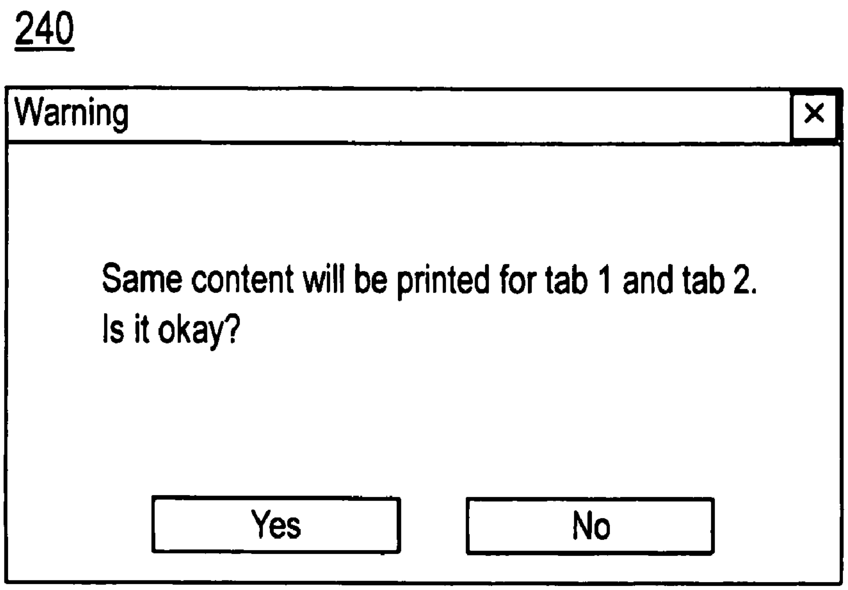
FIG. 19 is a diagram showing an example of a warning screen.

On the other hand, if the information specified at the first tab printing information setup section 133 is identical to the information specified at the second tab printing information setup section 143, a warning is issued to the user. This is because different printing information is often specified at both the first tab printing information setup section 133 and the second tab printing information setup section 143. FIG. 19 shows an example of a warning screen 240.

Figure 20:
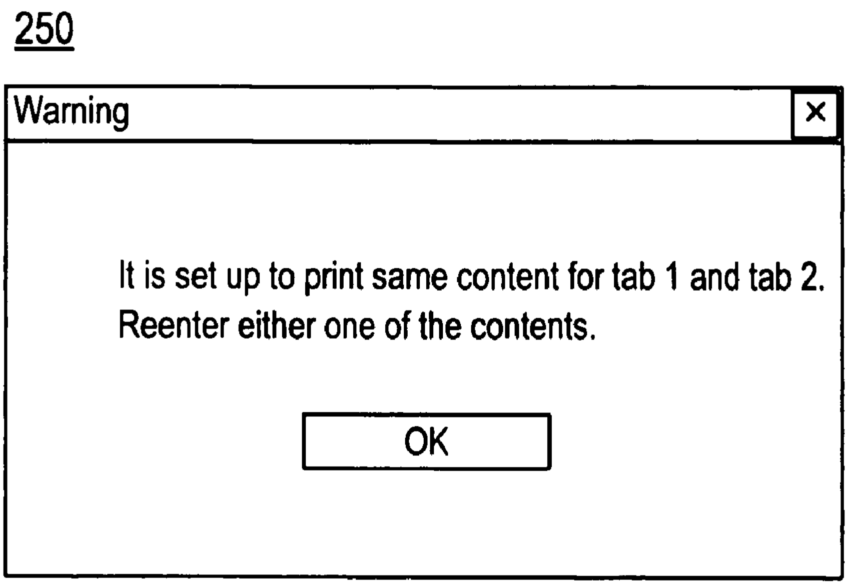
FIG. 20 is a diagram showing an example of a warning screen.

It can also be constituted in such a way as to prohibit the information specified at the second tab printing information setup section 143 from being set up identical to the information specified at the first tab printing information setup section 133. In this case, a message prompting the user to correct one of the instructions that are designating the same printing information appears on the warning screen 250 as shown in FIG. 20.

Figure 21:
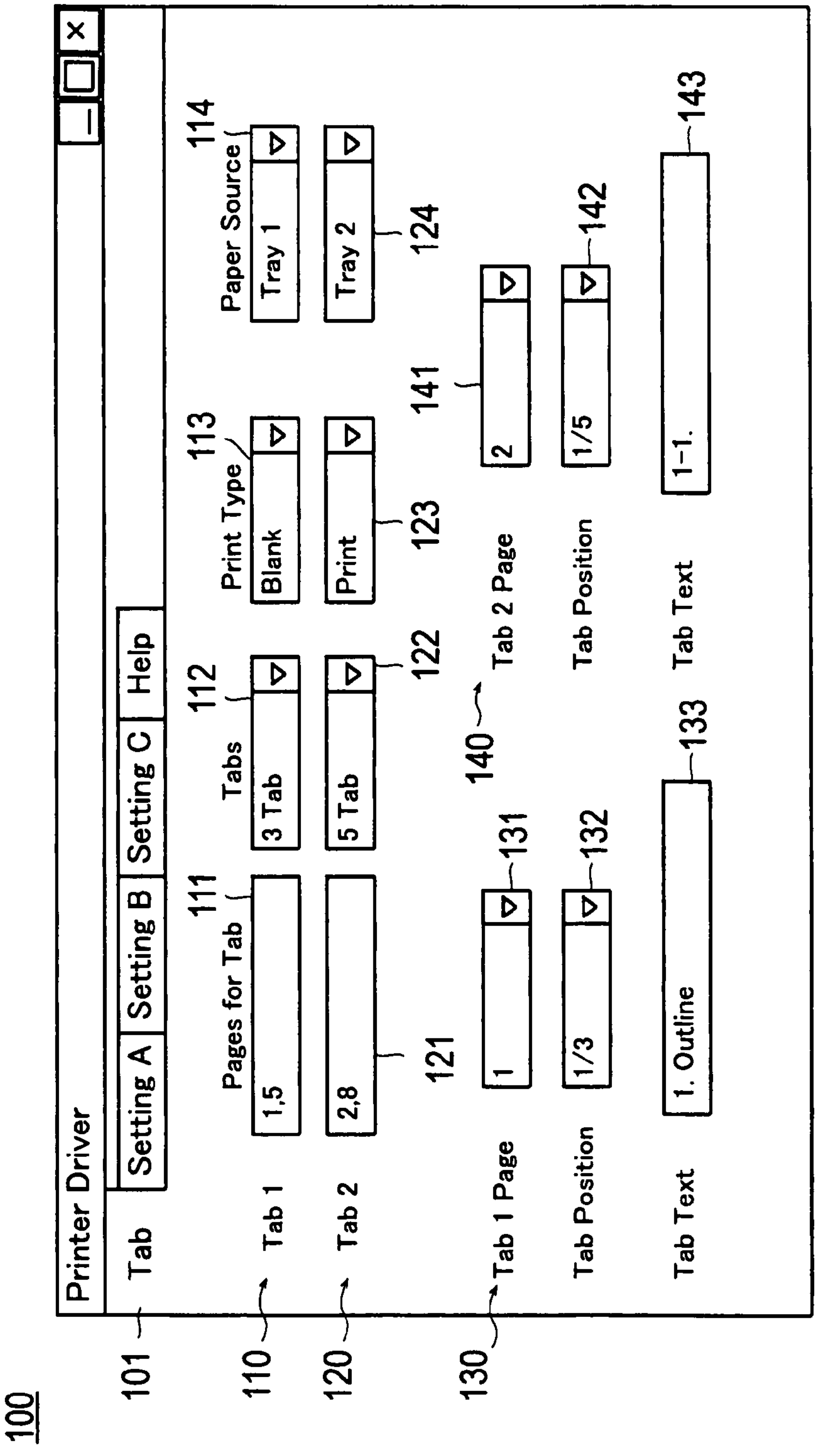
FIG. 21 is a diagram showing the tab sheet setup screen being used.

Moreover, as shown in FIG. 21, it is preferable that a portion of the information specified at the first tab printing information setup section 133 is automatically entered at the second tab printing information setup section 143 based on the information specified at the first tab printing information setup section 133 from the standpoint of improving the user's productivity. More specifically, a portion of the information specified at the first tab printing information setup section 133 is entered automatically into the second tab printing information setup section 143 based on the information specified at the first tab printing information setup section 133 and the insertion page position set up at the second insertion page position setup section 121. For example, it is because that, if the first tab sheet is the tab sheet used for chapter breaks and the second tab sheet is the tab sheet to be used for the paragraph breaks, the chapter number is often added to the paragraph number. In a case shown in FIG. 21, while it uses only "1" of the information "1. Outline," which is information specified at the first tab printing information setup section 133, and "1-1." is used as printing information at the second tab printing information setup section 143 in the end, it can also be able to be constituted in such a way as to use, for example, the entire "1. Outline" and to specify "1. Outline-1" as the printing information at the second tab printing information setup section 143 in the end.

In step S107, the instruction for specifying the disposal of tab sheets that became no longer necessary is received.

In other words, the user selects one from the separate discharging setup section 151, the separation sheet insertion setup section 152, or the offset setup section 153. In case the user selects the separate discharging setup section 151, he also specifies the discharge tray to which the first tab sheet that became no longer necessary at the first discharge tray setup section 161 and the second discharge tray setup section 162. The user specifies alternatively a sheet supply tray for separation at the sheet supply tray setup section 163 if he selects the separation sheet inserting setup section 152.

The user can alternatively specify the reversing discharge process that reverses the front and back sides of the tab sheets that became no longer necessary before discharging them by placing a checkmark to the reversing setup section 154.

The execution order for steps S104-S107 can be arbitrarily changed.

In step S108, PDL data is generated by converting the document file prepared by using applications.

The setup information concerning the tab sheet obtained in steps S104-S107 is written into the PDL data as command data. For example, the command data "PERPAGESET=TRAY 1 . . . 3 TAB, 1, 10" indicates that the supply source of the tab sheet is "Tray 1" (the supply tray 51 shown in FIG. 5), the type of the tab sheet is 3-tab, and the tab sheet insertion positions are pages 1 and 10. Other setup information is described as command data in the PDL data.

Next, in step S109, the PDL data thus prepared is transmitted to the printer controller 2 of the printing system 4 via the network 5.

The tab sheet setup screen 100 having the first tab sheet insertion setup section 110 for setting up the first tab sheet insertion and the second tab sheet insertion setup section 120 for setting up the second tab sheet insertion is provided to the user as described above.

Therefore, the user can operate while confirming both the setup concerning the insertion of the first tab sheet and the setup concerning the insertion of the second tab sheet on the tab sheet setup unit 100. This makes it possible for the user to set up multiple types of tab sheets while increasing productivity and minimizing the chance of causing errors.

Moreover, as mentioned before, if setup is intended to be made concerning multiple types of tab sheets that is unlikely to be specified by the user, a warning will be issued to the user. Otherwise, assistance will be provided to the user concerning the setup for tab sheets.

Thus, it enables the user to set up multiple types of tab sheets while increasing productivity and minimizing the chance of causing errors.

Figure 22:
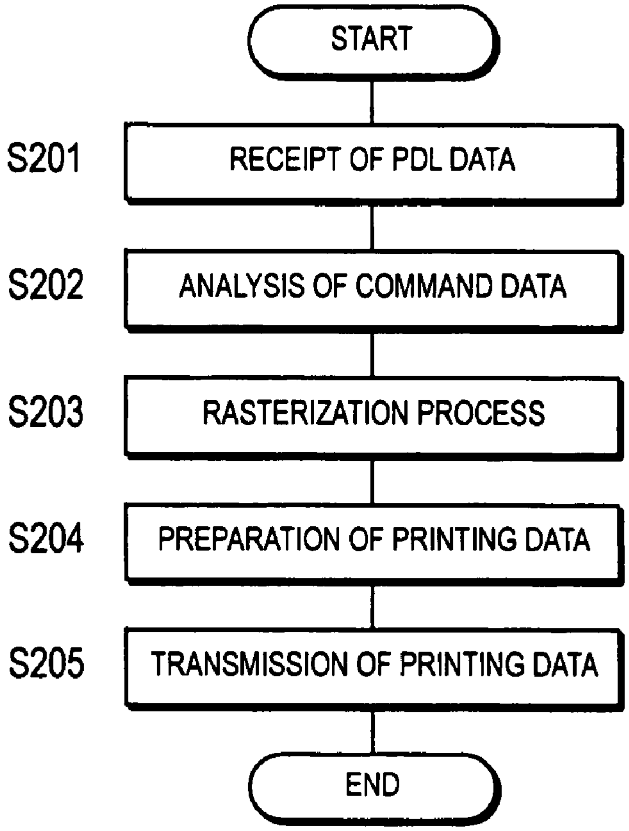
FIG. 22 is a flowchart showing the process sequence on the printer controller.

Next, the job process in the printer controller 2 will be described below referring to FIG. 22. The algorithm shown in the flowchart of FIG. 22 is stored as a program in a memory unit such as a hard disk 24 of the printer controller 2 and executed by the CPU 21.

First, the printer controller 2 receives the PDL data from the PC1 (step S201), and analyzes the command data described in the PDL data (S202). Here, the setup information concerning the tab sheet is identified as the command data is analyzed.

Next, the received PDL data is rasterized in order to obtain bitmap data, which is bitmap type image data (S203).

Printing data is then prepared by adding header information containing setup information concerning the tab sheet to the bitmap data obtained in step S203 (S204), and the particular printing data is transmitted to the printer 3 as a printing job.

Figure 23:
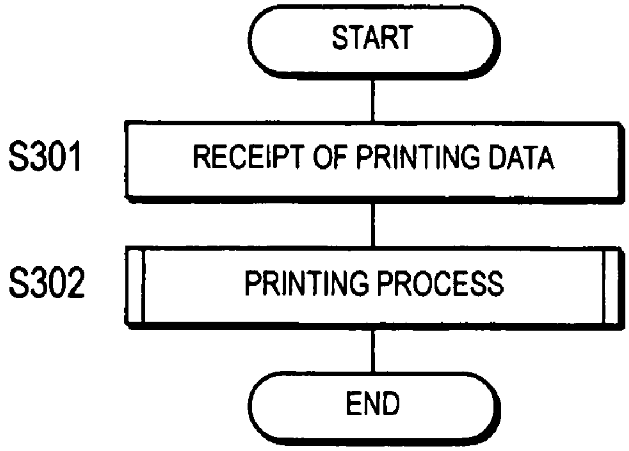
FIG. 23 is a flowchart showing the process sequence on the printer.

Next, the job process in the printer 3 will be described below referring to FIGS. 23-25. The algorithm shown in the flowcharts of FIGS. 23-25 is stored as a program in a memory unit such as a ROM 32 of the printer 3 and executed by the CPU 31.

The printer 3 receives the printing data from the printer controller 2 as the printing job (step S301). Next, the printer 3 executes the printing process.

Figure 24:
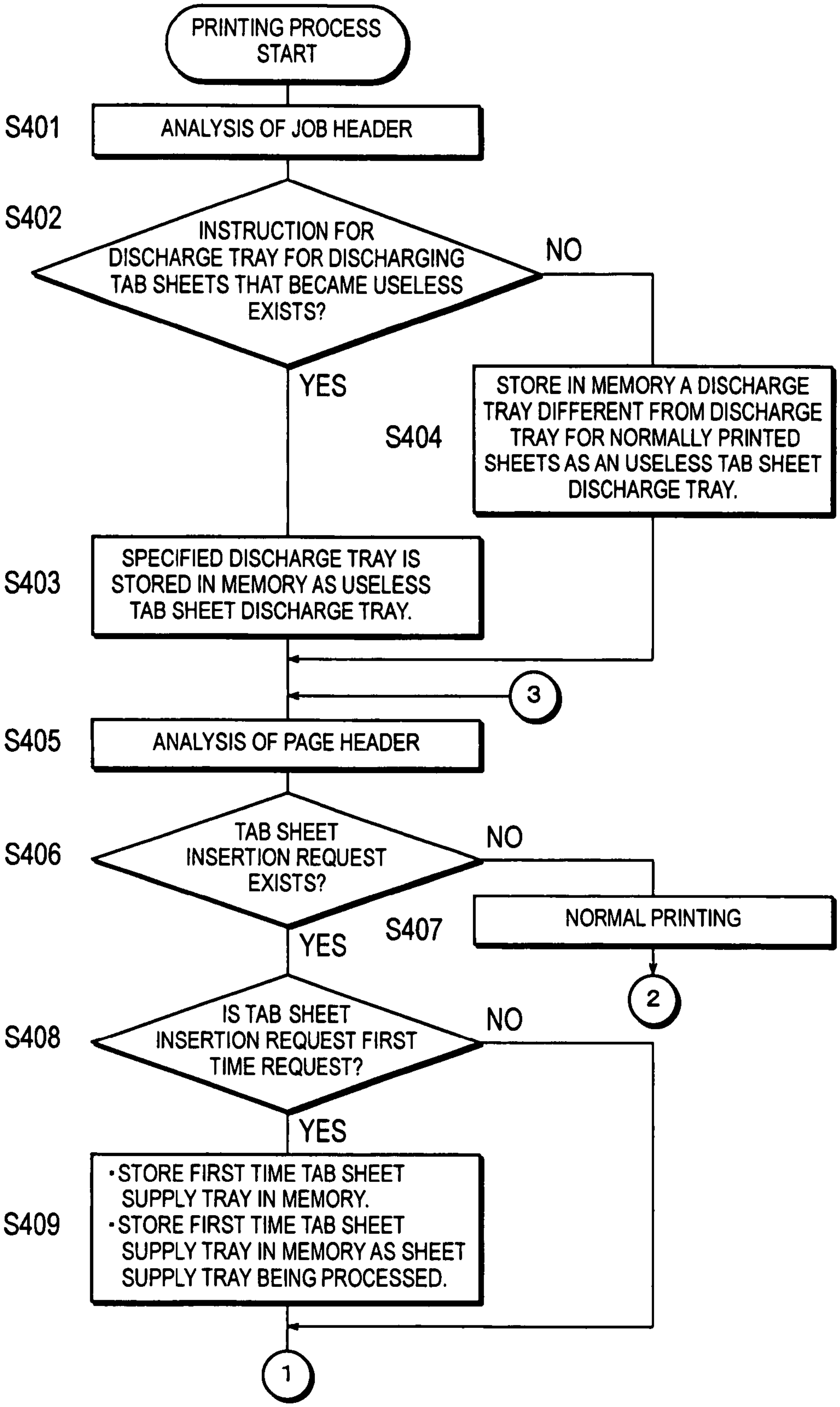
FIG. 24 is a flowchart showing the procedure of the printing process.
Figure 25:
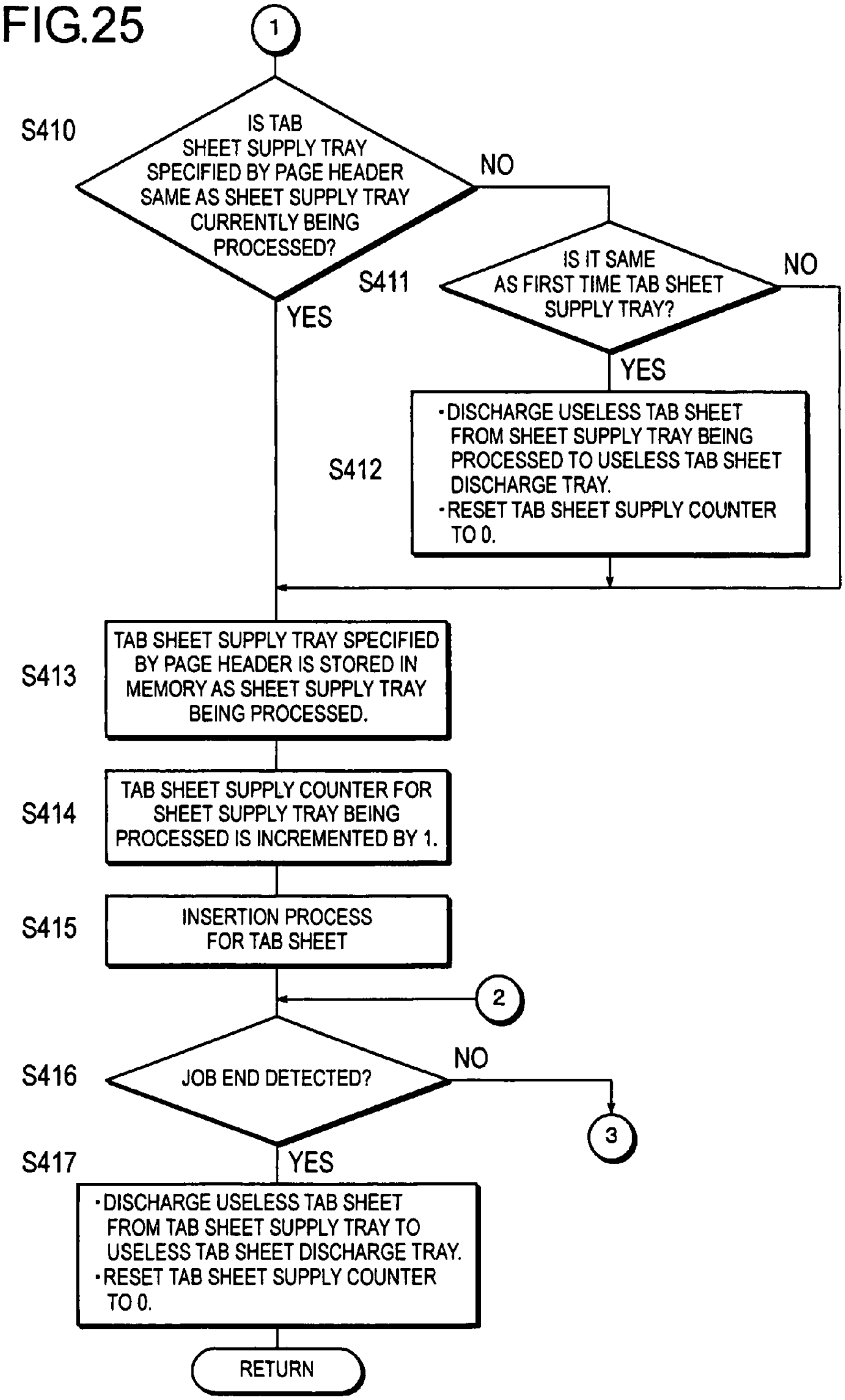
FIG. 25 is a flow chart, continuing from FIG. 24, showing the printing procedure.

As the printing process is initiated, the job header contained in the header information is first analyzed as shown in FIG. 24 (S401).

Figure 26:
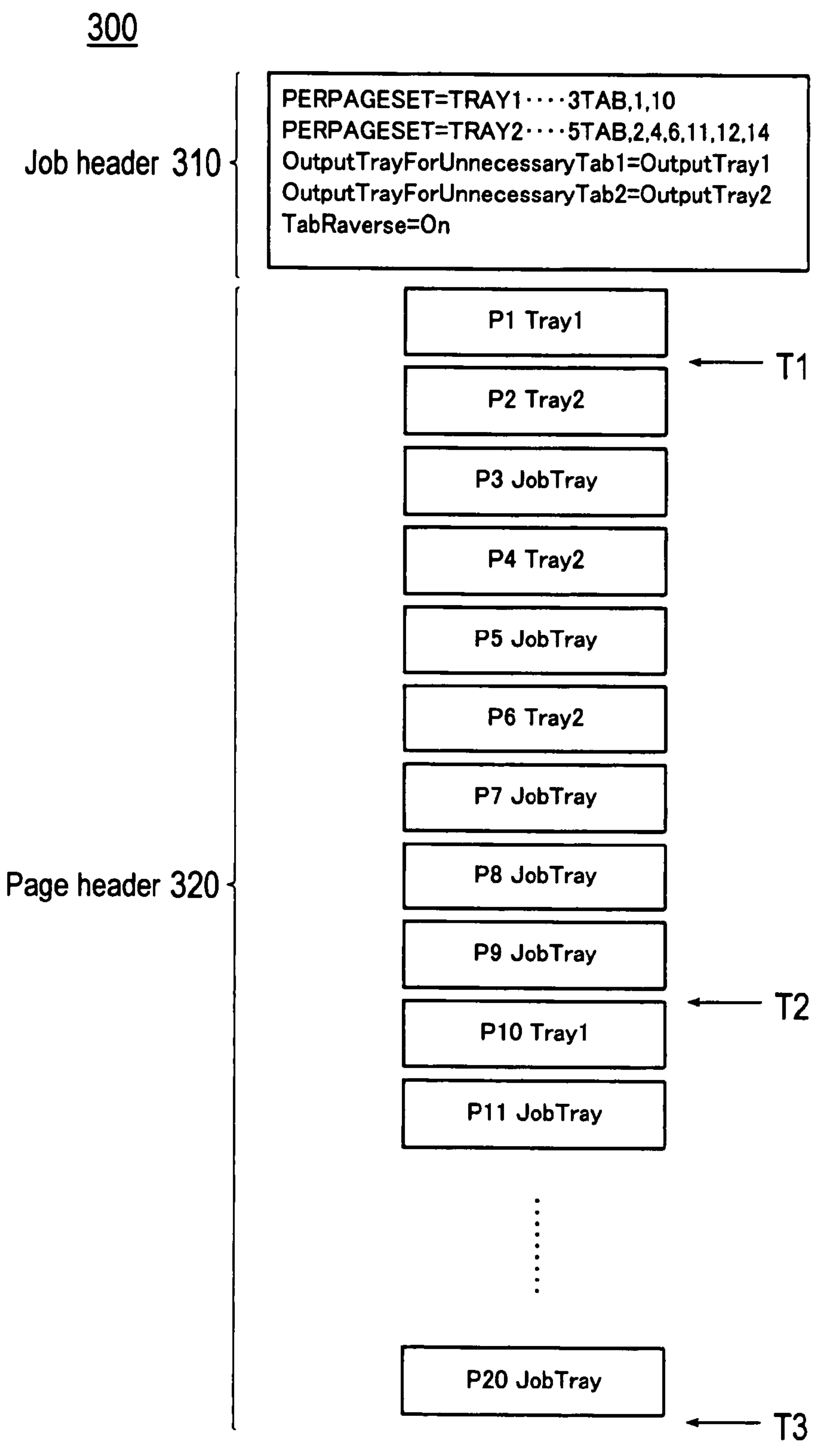
FIG. 26 is a conceptual diagram of the header information.

FIG. 26 is a conceptual diagram of the header information. The header information 300 comprises a job header 310 which is an additional information related to the entire printing job and a job header 320 which is an additional information related to specific pages included in the printing job.

For example, the job header 310 shown in FIG. 26 contains the setup information concerning the tab sheets consisting of the following contents. For example, the supply source of the first tab sheet is "Tray 1" (the sheet supply tray 51 shown in FIG. 5), the type of the first tab sheet is Stab, and the insertion page locations of the first tab sheet are pages 1 and 10. Also, the supply source of the second tab sheet is "Tray 2" (the sheet supply tray 52 shown in FIG. 5), the type of the second tab sheet is 5-tab, and the insertion page locations of the second tab sheet are pages 2, 4, 6, 11, 12, and 14. The discharge destination of the first tab sheet that became no longer necessary is "OutputTray 1" (the discharge tray 61 shown in FIG. 5), and the discharge destination of the second tab sheet that became no longer necessary is "OutputTray 2" (the discharge tray 62 shown in FIG. 5). Also, there is a reversing discharge instruction for reversing the front and back sides of the tab sheets that became no longer necessary.

In the page header 320 shown in FIG. 26, "P1,", "P2," . . . denote the page numbers to be printed, "Tray1" and "Tray2" denote the sheet supply trays that supply the tab sheets to those page positions, and "JobTray" indicate that there is no tab sheet to be inserted to those pages and the sheets to be used for printing those pages are supplied from the sheet supply trays specified by the printing job.

The flowchart shown in FIG. 24 and FIG. 25 is used to describe a process case which is setup for discharging the tab sheets that became no longer necessary to different discharge trays depending on the types of tab sheets.

In step S402, a judgment is made as to whether or not a discharge tray is specified as a discharge destination for a tab sheet that became no longer necessary.

If there is a discharge tray specified as the discharge destination for the tab sheet that became no longer necessary (S402: Yes), the specified discharge tray is stored in a memory such as the RAM 33 as an unnecessary tab sheet discharge tray (S403). On the contrary, if no discharge tray is specified as the discharge destination for a tab sheet that has become no longer necessary (S402: No), a discharge tray different from the discharge tray used for normally printed sheets as an unnecessary tab sheet discharge tray in the memory (S404).

Next, the page header 320 is analyzed (S405). The analysis of the page header 320 is conducted for each process in accordance with the description of the printing job in sequence. The process on the tab sheet and the process on normal pages being printed are executed individually.

Based on the analysis of the page header 320, a judgment is made whether or not there is a demand for tab sheet insertion (S406).

If there is no request for tab sheet insertion (S406: No), normal printing, i.e., printing of one page portion is executed (S407), and the program advances to step S416.

When a tab sheet insertion request exists (S4-6: Yes), a judgment is made whether said tab sheet insertion request is the first time request or not (S408).

If it is judged that it is a tab sheet insertion request of the first time (S408: Yes), the sheet supply tray specified for the first time tab sheet insertion request (hereinafter called "first time tab sheet supply tray") is stored in the memory (S409). The first time tab sheet supply tray is stored in the memory as the sheet supply tray being processed (S409).

On the other hand, if it is judged that it is not the tab sheet insertion request of the first time (S408: No), the program advances to the step S410.

In step S410, a judgment is made whether or not the tab sheet supply tray specified at the page header 320 is the same as the currently processed sheet supply tray stored in the memory. In other words, a judgment is made whether or not the sheet supply tray for the tab sheet to be used has changed.

If it is judged that the tab sheet supply tray specified at the page header 320 is the same as the currently processed sheet supply tray stored in the memory (S410: Yes), the program advances to the step S413.

In step S413, the tab sheet supply tray specified by the page header 320 is stored in the memory as the sheet tray currently being processed.

Next, the tab sheet supply count is incremented by 1 for the sheet tray being currently processed (S414). The tab sheet supply count (initial value=0) is counted per each tab sheet tray and is stored in the memory per each tab sheet supply tray.

Then, the tab sheet insertion process is executed (S415). In other words, a tab sheet is supplied from the sheet supply tray being currently processed, which is stored in the memory, and is inserted at the specified page position.

In step S416, a judgment is made whether or not the job end is detected for the printing data (S416), i.e., whether the entire process has been completed for the printing data.

If the job end is not detected (S416: No), the program returns to step S405 and executes the following process.

If, on the other hand, it is judged that the tab sheet supply tray specified by the page header 320 in step S410 is different from the sheet supply tray, which is stored in the memory as the one being currently processed (S410: No), a judgment is made as to whether or not the tab sheet supply tray specified by the page header 320 is the same as the initial tab sheet supply tray, which is stored in the memory (S411). In other words, a judgment is made whether the tab sheet tray being used is the initial tab sheet tray returned from another tab sheet supply tray or a tab sheet tray changed from the initial tab sheet supply tray.

If it is judged that the tab sheet tray being used is a tab sheet supply tray changed from the initial tab sheet supply tray (S411: No, T1 shown in FIG. 26), the program advances to step S413. This is a case where the first tab sheet inserted is of 3-tab, and the second tab sheet is of 5-tab, i.e., a case when a 3-tab sheet is inserted first and then a 5-tab sheet insertion request is made. In this case, the sheet supply tray after the switch is made is stored in the memory as the sheet supply tray being currently processed in step S413.

On the other hand, if it is judged that the tab sheet tray being used is the initial tab sheet supply tray changed from another tab sheet supply tray (S411: Yes, T2 shown in FIG. 26), the program advances to step S412.

In step S412, the tab sheets that became no longer necessary are discharged from the sheet tray currently being processed to the unnecessary tab sheet discharge tray, which has been stored in the memory. Then, the tab sheet supply count stored in the memory for the sheet tray being processed is reset to "0" as the tab sheet discharge per set unit is completed. Next, the sheet supply tray after the switch is made is stored in the memory as the sheet supply tray being currently processed in step S413.

Step S412 is executed when, for example, a 3-tab is inserted first, then a 5-tab sheet is inserted, which is followed by an insertion request for a 3-tab request again. It is because, if another 5-tab insertion request is made, a tab sheet with the ⅕ position tab must first be used in this case.

As mentioned above, even if a single copy printing is in process for the printing job, tab sheets that became no longer necessary are discharged. Therefore, even if multiple types of tab sheets are used, it is possible to discharge properly the tab sheets that became no longer necessary.

In general, if it is assumed that the number of sheet supplies is N, the number of constituents of one set of tab sheets is S, and the number of discharge count is D, it holds that D=S—(remainder of N/S) (except that if D=S, D=0). In other words, tab sheets are discharged from the sheet tray currently being processed to the unnecessary sheet discharge tray. For example, if sheets are supplied 7 times from a 5-tab sheet supply tray, N=7, S=5, and the remainder of 7 divided 5 is 2, so that the calculation becomes D=5−2=3.

As described above, the number of tab sheets supplied is counted per each sheet supply tray, the number of tab sheets that became no longer necessary is calculated based on the count of the number of tab sheets supplied, and the calculated number of tab sheets that became no longer necessary are discharged. Therefore, even if multiple types of tab sheets are used, the number of sheets that became no longer necessary per each type of tab sheets can be easily calculated, so that the tab sheets that became no longer necessary can be discharged without fail.

On the other hand, if the job end is detected in step S416 (S416: Yes, T3 of FIG. 26), tab sheets that became no longer necessary are discharged from all the tab sheet supply trays to respective unnecessary tab sheet discharge trays stored in the memory (S417). For example, according to the job header 310 shown in FIG. 26, the 3-tab sheet 500, which is the first tab sheet is discharged to "Output 1" (discharge tray 61), and the 5-tab sheet 600, which is the second tab sheet is discharged to "Output 2" (discharge tray 62). The discharge count D of the tab sheets that became no longer necessary is as described before. Also, the tab sheet supply counts stored in the memory for all the sheet trays are reset to "0" as the tab sheet discharge per set unit is completed.

While the discharge control for the unnecessary tab sheet is described to be conducted in accordance with the change of the sheet trays as they supply sheets in the flowchart of FIGS. 24 and 25, the discharge control for the unnecessary tab sheet can be conducted in accordance with the change of types of supplied tab sheets as well. In this case, the number of supplied tab sheets is counted, for example, per each type of tab sheet.

As described above, in this embodiment, the tab sheets that became no longer necessary are controlled to be discharged per type of tab sheet by discharging them to different discharge trays depending on the type of tab sheets. As a consequence, the separation of the tab sheets per each type can be done very easily for the purpose of reusing the tab sheets that became no longer necessary, even when multiple types of tab sheets are used.

Figure 27:
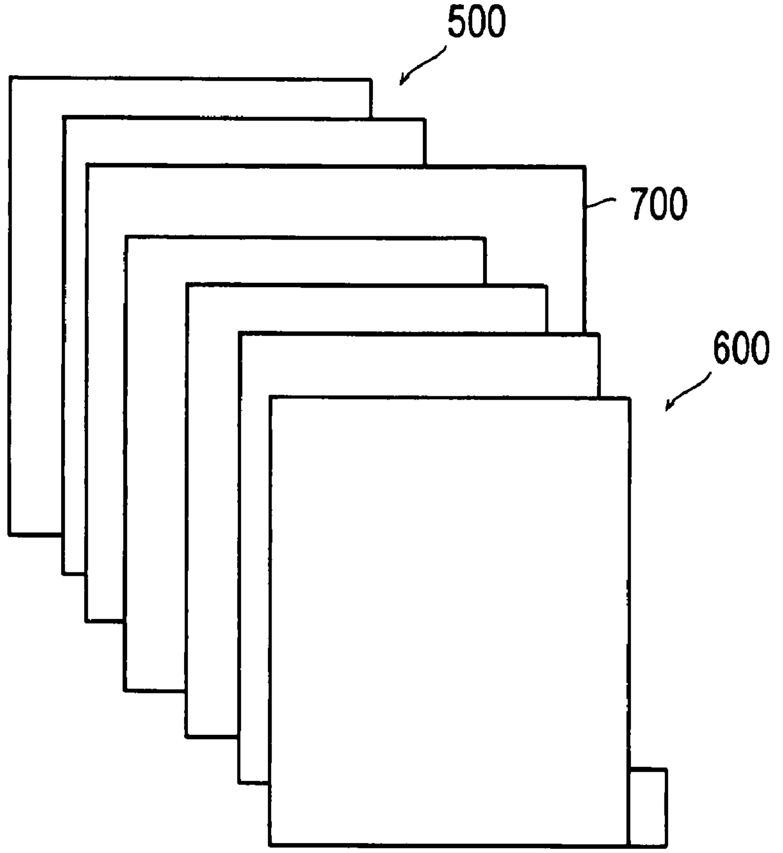
FIG. 27 is a diagram for describing the method of discharging tab sheets that became no longer necessary.

It can also be controlled so as to discharge tab sheets that became no longer necessary by separating them according to their types by inserting separation sheets at type breaks. In this case, the job header 310 includes descriptions for specifying the separation sheet supply trays instead of descriptions for specifying discharge destinations for tab sheets that became no longer necessary as shown in FIG. 26. For example, the description of "SeparationSheet=Tray3" indicates that the supply tray for the tab sheet separation sheet for separating tab sheets that became no longer necessary is "Tray 3" (sheet supply tray 53). As the printer 3 identifies a description specifying the separation sheet supply tray in the job header 310, it executes a process similar to the process shown in FIGS. 24 and 25, and discharges the tab sheets 500 and 600 that became no longer necessary by inserting a separation sheet 700 at the tab sheet break position as shown in FIG. 27 when discharging the tab sheets that became no longer necessary (in steps S412 and S417). This also makes it possible to execute the separation of the tab sheets per each type very easily in case of reusing the tab sheets that became no longer necessary.

It can also be controlled so as to discharge tab sheets that became no longer necessary by offsetting the discharge position by each type of tab sheets. In this case, the job header 310 includes descriptions for offsetting the discharge position by each type of the tab sheets instead of descriptions for specifying discharge destinations for tab sheets that became no longer necessary as shown in FIG. 26. For example, the description of "TabOffset=On" is included in the job header 310. As the printer 3 identifies a description specifying the offsetting of the discharge position by each type of tab sheets in the job header 310, it executes a process similar to the process shown in FIGS. 24 and 25, and discharges the tab sheets 500 and 600 that became no longer necessary by offsetting the discharge positions by each type of tab sheets as shown in FIG. 28 when discharging the tab sheets that became no longer necessary (in steps S412 and S417). This also makes it possible to execute the separation of the tab sheets per each type very easily in case of reusing the tab sheets that became no longer necessary.

Figure 29:
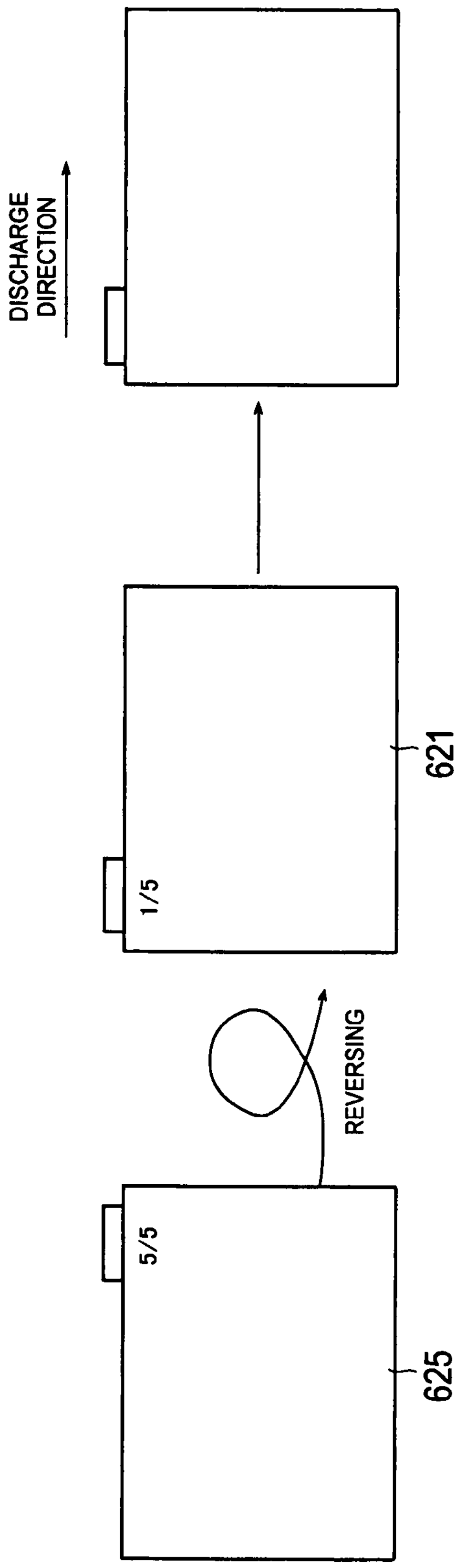
FIG. 29 is a diagram for describing the method of discharging tab sheets that became no longer necessary by turning them over.

As the printer 3 identifies a description specifying an instruction for reversing the front and back sides of the tab sheets that became no longer necessary before they are discharged ("TabReverse=On" shown in FIG. 26) in the job header 310, it reverses and discharges the tab sheets that became no longer necessary by causing them to pass through the reversing mechanism 70 as shown in FIG. 29 when discharging the tab sheets that became no longer necessary (in steps S412 and S417). Further, the tab sheets can be reversed by means of the reversing mechanism for double-side printing.

As described in the above, tab sheets that became no longer necessary are reversed by the user's instruction. Thus, the tab sheets that became no longer necessary can be reused as tab sheets with the tab positions different from their original positions. Therefore, tab sheets that became no longer necessary but are otherwise useful as precious constituents of the system can be easily reused without having to reverse manually. More specifically, the tab sheet 625 having the tab position 5/5 can be reused as the tab sheet 621 having the tab position, not 5/5 but 1/5 if its front and back sides are reversed.

Next, the second embodiment will be described below focusing primarily on the points different from the first embodiment.

Figure 30:
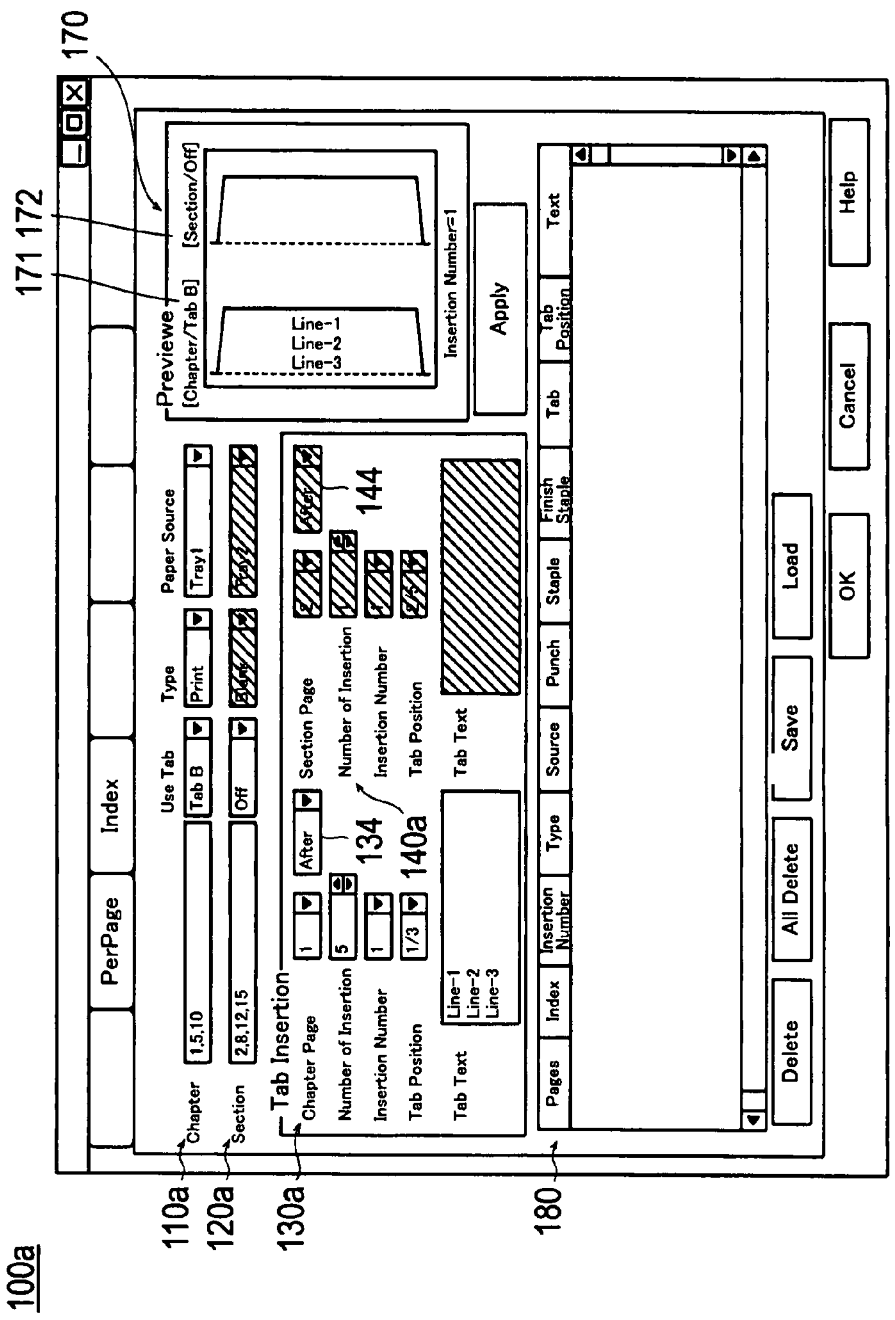
FIG. 30 is an example of tab sheet setup screen in a second embodiment.

FIG. 30 is an example of tab sheet setup screen 100*a* in the second embodiment.

The tab sheet setup screen 100*a* has a chapter break tab sheet insertion setup section 110*a* for setting up the insertion of a chapter break tab sheet at each chapter break in the document, and a paragraph break tab sheet insertion setup section 120*a* for setting up the insertion of a paragraph break tab sheet at each paragraph break in a document. In other words, the first and second tab sheets in the first embodiment are specified as the chapter break tab sheet and the paragraph break tab sheet in the second embodiment.

The tab sheet setup screen 100*a* further has a chapter break tab sheet setup section 130*a* for setting up the chapter break tab sheet for a specified insertion page position, and a paragraph break tab sheet setup section 140*a* for setting up the paragraph break tab sheet for a specified insertion page position. The chapter break tab sheet setup section 130*a* includes a chapter break tab sheet insertion position setup section 134 for allowing the user to select either to insert the chapter break tab sheet before or after the page indicated by the insertion page position. The paragraph break tab sheet setup section 140*a* includes a paragraph break tab sheet insertion position setup section 144 for allowing the user to select either to insert the paragraph break tab sheet before or after the page indicated by the insertion page position.

The tab sheet setup unit 100*a* has a tab preview section 170 for displaying preview images for the tab of the chapter break tab sheet and the tab of the paragraph break tab sheet by each type of tab sheets. If the printing information of the tab for a tab sheet is specified here, the tab preview image includes the specified printing information. This makes it possible for the user to visually confirm the tab of a tab sheet by each type of tab sheets, so that the user can specify the type of a tab sheet and the information to be printed on the tab. In case of FIG. 30, pages 2, 8, 12, and 15 are specified as the pages for inserting the chapter break tab sheets in the chapter break tab sheet insertion setup section 120*a*, but it is set up for not using tab sheets ("Off" for "Use Tab"). As a consequence, various setup items based on the premise of inserting tab sheets at chapter breaks are grayed out (it is shown as diagonal line hatching in the FIG. 30), indicating that they cannot be set up.

In this embodiment, the tab preview section 170 includes a chapter preview section 171 for displaying preview images of the tabs of the chapter break tab sheets, and a paragraph preview section 172 for displaying paragraph images of the tabs of the paragraph break tab sheets, wherein the chapter preview section 171 and the paragraph preview section 172 are disposed in separate areas.

The displayed preview image is controlled preferably in such a manner that only the preview image for the tab of the tab sheet currently operated by the user among the chapter beak tab sheet and the paragraph break tab sheet. The tab preview images of the tab of the tab sheet that is not the one of the chapter break tab sheet and the paragraph break tab sheet being used by the user can be grayed out. Also, the tab preview section 170 can have only one area for displaying the preview image of either of the tab of the chapter break tab sheet or the tab of the paragraph break tab sheet and, in such a case, only the preview image of the tab of the tab sheet that the user is operating among the chapter break tab sheet and the paragraph break tab sheet is displayed.

The tab sheet setup screen 100*a* also has a page unit setup list 180. The page unit setup list 180 displays a specified content per page as a list. This makes it possible for the user to confirm the setup content.

This embodiment enables the user, in addition to an effect similar to what is available by the first embodiment, to set up different types of tab sheets for chapters and paragraphs when the document file consists of chapters and paragraphs, thus further improving the user's benefits.

The invention is not limited to the embodiment described above, but also can be changed in various ways within the scope of the claims.

For example, although a case of two types of tab sheets are inserted is described in the above embodiments, the present invention is applicable to a case inserting more three or more types of tab sheets.

Moreover, although it is described in the above embodiment a case of the process of setting up tab sheets being executed by the printer driver, it can be executed by an application instead of the printer driver.

Further, although it is described in the above embodiment a case of the setup concerning tab sheets is conducted using the tab sheet setup screen 100, which is displayed on the display 15 of the PC 1, it can be executed using the tab sheet setup screen, which is displayed on the operating panel unit 34 of the printer 3.

Furthermore, although it is described in the above embodiment a constitution wherein the printing system 4 is divided into the printer controller 2 and the printer 3, both of which are locally connected, the printer controller 2 can be built into the printer 3.

Also, although the embodiments described above uses a printer as the image forming apparatus, the invention is not limited to it. The present invention is applicable to an image forming apparatus such as MFP (Multi-Function Peripheral) and a copying machine as well.

The means and method of conducting various processes in the network system according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a memory unit such as a hard disk. Said program can also be provided as independent application software or can be built into the software of the image processing device as a part of its function.

What is claimed is:

1. An image forming apparatus, comprising:

a tab sheet supply unit for supplying tab sheets;

a judgment unit for judging whether or not a reversing discharge instruction is issued for reversing front and back sides of tab sheets that became no longer necessary before discharging them; and a control unit for reversing the front and back sides of the tab sheets that became no longer necessary and discharging them when the reversing discharge instruction is issued;

wherein when the reversing discharge instruction is issued, the front and back sides of at least one tab sheet that became no longer necessary are reversed so that a tab of the reversed tab sheet in an original tab position is changed to a new tab position and the reversed tab sheet is automatically situated to be used as a tab sheet with the tab in the new tab position.

2. The image forming apparatus as claimed in claim 1, wherein said tab sheet supply unit comprises a plurality of sheet supply trays for supplying multiple types of tab sheets; and said control unit further classifies the tab sheets that became no longer necessary according to the types of tab sheets and discharges them.

3. A non-transitory computer readable recording medium stored with a control program for controlling an image forming apparatus, said control program causing a computer to execute a process comprising:

receiving a request for initiating a setup concerning tab sheets; and providing to the user a reversing setup section for specifying reverse discharge to cause the tab sheets that became no longer necessary to be reversed and discharged;

wherein when the reverse discharge is specified, the control program causes the computer to execute a process in which the front and back sides of at least one tab sheet that became no longer necessary are reversed so that a tab of the reversed tab sheet in an original tab position is changed to a new tab position and the reversed tab sheet is automatically situated to be used as a tab sheet with the tab in the new tab position.

4. A method for controlling an image forming apparatus comprising:

receiving a request for initiating a setup concerning tab sheets; and providing to the user a reversing setup section for specifying reverse discharge to cause the tab sheets in the image forming apparatus that became no longer necessary to be reversed and discharged;

wherein when the reverse discharge is specified, the front and back sides of at least one tab sheet that became no longer necessary are reversed so that a tab of the reversed tab sheet in an original tab position is changed to a new tab position and the reversed tab sheet is automatically situated to be used as a tab sheet with the tab in the new tab position.

* * * * *